Aug. 28, 1951

C. W. NORTON ET AL

SYMBOL TYPING AND TAPE FEEDING MECHANISM FOR TYPEWRITING MACHINES 2,565,985

Filed Aug. 10, 1946

17 Sheets-Sheet 1

FIG. I

INVENTORS
CHARLES W. NORTON
and JOHN H. RITZ
BY Ramsey, Kent & Chisholm
THEIR ATTORNEYS Aug. 28, 1951

C. W. NORTON ET AL

SYMBOL TYPING AND TAPE FEEDING MECHANISM FOR TYPEWRITING MACHINES 2,565,985

Filed Aug. 10, 1946

17 Sheets-Sheet 2

INVENTORS
CHARLES W. NORTON
and JOHN H. RITZ
BY
Ramsey, Kent & Chisholm
THEIR ATTORNEYS Aug. 28, 1951 C. W. NORTON ET AL 2,565,985

SYMBOL TYPING AND TAPE FEEDING MECHANISM FOR TYPEWRITING MACHINES

Filed Aug. 10, 1946 17 Sheets-Sheet 3

INVENTORS
CHARLES W. NORTON
BY and JOHN H. RITZ
Ramsey, Kent & Chisholm
THEIR ATTORNEYS INVENTORS
CHARLES W. NORTON
and JOHN H. RITZ
BY
Ramsey, Kent & Chisholm
THEIR ATTORNEYS Aug. 28, 1951 C. W. NORTON ET AL 2,565,985

SYMBOL TYPING AND TAPE FEEDING MECHANISM FOR TYPEWRITING MACHINES

Filed Aug. 10, 1946 17 Sheets-Sheet 5

INVENTORS
CHARLES W. NORTON
and JOHN H. RITZ
BY
Ramsey, Kent & Chisholm
THEIR ATTORNEYS

Aug. 28, 1951 C. W. NORTON ET AL 2,565,985

SYMBOL TYPING AND TAPE FEEDING MECHANISM FOR TYPEWRITING MACHINES

Filed Aug. 10, 1946 17 Sheets-Sheet 6

INVENTORS
CHARLES W. NORTON
and JOHN H. RITZ
BY
Ramsey, Kent & Chisholm
THEIR ATTORNEYS Aug. 28, 1951 C. W. NORTON ET AL 2,565,985

SYMBOL TYPING AND TAPE FEEDING MECHANISM FOR TYPEWRITING MACHINES

Filed Aug. 10, 1946 17 Sheets-Sheet 7

INVENTORS
CHARLES W. NORTON
and JOHN H. RITZ
BY Ramsey, Kent & Chisholm
THEIR ATTORNEYS INVENTORS
CHARLES W. NORTON
and JOHN H. RITZ
BY
Ramsey, Kent & Chisholm
THEIR ATTORNEYS Aug. 28, 1951 C. W. NORTON ET AL 2,565,985

SYMBOL TYPING AND TAPE FEEDING MECHANISM FOR TYPEWRITING MACHINES

Filed Aug. 10, 1946 17 Sheets-Sheet 9

INVENTORS
CHARLES W. NORTON
and JOHN H. RITZ
BY
Ramsey, Kent & Chisholm
THEIR ATTORNEYS INVENTORS
CHARLES W. NORTON
and JOHN H. RITZ
BY
Ramsey, Kent & Chisholm
THEIR ATTORNEYS INVENTORS
CHARLES W. NORTON
and JOHN H. RITZ
BY Ramsey, Kent & Chisholm
THEIR ATTORNEYS Aug. 28, 1951 C. W. NORTON ET AL 2,565,985

SYMBOL TYPING AND TAPE FEEDING MECHANISM FOR TYPEWRITING MACHINES

Filed Aug. 10, 1946 17 Sheets-Sheet 12

INVENTORS
CHARLES W. NORTON
and JOHN H. RITZ

BY Ramsey, Kent & Chisholm
THEIR ATTORNEYS

Aug. 28, 1951 C. W. NORTON ET AL 2,565,985

SYMBOL TYPING AND TAPE FEEDING MECHANISM FOR TYPEWRITING MACHINES

Filed Aug. 10, 1946 17 Sheets-Sheet 13

INVENTORS
CHARLES W. NORTON
and JOHN H. RITZ
BY
Ramsey, Kent & Chisholm
THEIR ATTORNEYS INVENTORS
CHARLES W. NORTON
and JOHN H. RITZ
BY Ramsey, Kent & Chisholm
THEIR ATTORNEYS INVENTORS
CHARLES W. NORTON
and JOHN H. RITZ
BY
Ramsey, Kent & Chisholm
THEIR ATTORNEYS INVENTORS
CHARLES W. NORTON
and JOHN H. RITZ
BY
Ramsey, Kent & Chisholm
THEIR ATTORNEYS INVENTORS
CHARLES W. NORTON
and JOHN H. RITZ
BY
Ramsay, Kent & Chisholm
THEIR ATTORNEYS Patented Aug. 28, 1951

2,565,985

UNITED STATES PATENT OFFICE 2,565,985

SYMBOL TYPING AND TAPE FEEDING MECHANISM FOR TYPEWRITING MACHINES

Charles W. Norton, West Orange, N. J., and John H. Ritz, Huntington, N. Y., assignors to Ralph C. Coxhead Corporation, New York, N. Y., a corporation of Delaware Application August 10, 1946, Serial No. 689,754

16 Claims. (Cl. 197—49)

This invention relates to typewriting machines designed for typing messages in generally linear symbols of varying lengths, such as dot-and-dash symbols of the telegraphic code, the typed messages being primarily intended to be used in the transmission of such messages. The invention is embodied for purposes of description in the machine known in the art as the "Varityper," wherein the printing type is embossed upon the shuttle movable over a circular anvil, a pigment ribbon being passed between the shuttle and the material to be printed upon, and the material to be printed upon being forced against the ribbon and type by a stroke from a printing hammer. It embodies a structure whereby a strip or tape of paper or other material is fed upward past the printing point of the machine, the printed message being delivered as a continuous tape. It also provides novel structure to meet the particular demands incident to the use of such symbols in a typewriter.

Inasmuch as the printed tape is customarily used subsequently for transmission of code messages by means of photoelectric or similar equipment, the typed symbols must be accurately and uniformly spaced on the tape in order to assure accurate transmission of the message printed thereon. This invention is directed to a typewriting machine capable of producing a tape satisfactory for such purpose.

It is an object of the invention to adapt a typewriter mechanism to the typing of messages in linear symbols of varying lengths, such as telegraphic code symbols of the dot-and-dash character.

Another object of the invention is to maintain the message tape in an accurate position relative to the printing point.

Another object of the invention is to assure accurate location of the printed characters relative to the tape upon which the message is printed, and to obtain accurate spacing of the symbols relative to each other along the tape, having due regard to the length of the symbols.

Another object of the invention is to regulate the feeding of the tape past the printing point to conform to the length of the various symbols or groups of dots and dashes and to the spacing between words and sentences in order to assure correct translation of the transmitted message, variable spacings between letters, words, and sentences being material elements in the translation of the message.

Another object of the invention is to provide novel means to shift the type upon operation of the shift key and to prevent interference thereto by simultaneous operation of the printing key.

Another object of the invention is to modify the action of the printing keys on the spacing mechanism when the spacing requirement is altered by a symbol brought to the printing point by operation of a shift key.

Another object of the invention is to provide an improved power-operated typing machine in which the various keys serve only as controls for the machine, all the operations of printing and feeding the tape and carbon ribbon being motor-actuated.

Another object of the invention is to provide a novel cyclic operating mechanism for a typewriter or the like whereby, upon operation of the printing key or of the space bar, a single rotation of the driving shaft effects all the movements and functions of the machine thereby determined.

A further object of the invention is to provide an improved clutch for a business machine which is adapted to be automatically disengaged from a driven shaft after having imparted a single rotation thereto.

Still further objects and advantages of the invention will appear as the description proceeds.

Our invention is defined in the appended claims. In the claims, as well as in the description, parts are identified by specific names for convenience, but such nomenclature is intended to be as generic, in its application to similar parts, as the prior art will permit. The words "printing" and "printed" are used in the claims in their broad sense of imprinting or marking, including marking with pigment and marking by embossing, indenting or perforating. The best form in which we have contemplated applying our invention is illustrated in the accompanying diagrammatic drawings forming part of this specification, in which:

This typewriting machine, which is adapted for the typing of characters of varying lengths such as telegraphic code messages which do not require capitalization and some other characters of ordinary printing, has thirty keys arranged in three banks of ten keys each. Eleven of these keys are utilized by means of shift keys for the typing of additional symbols.

Figure 4:
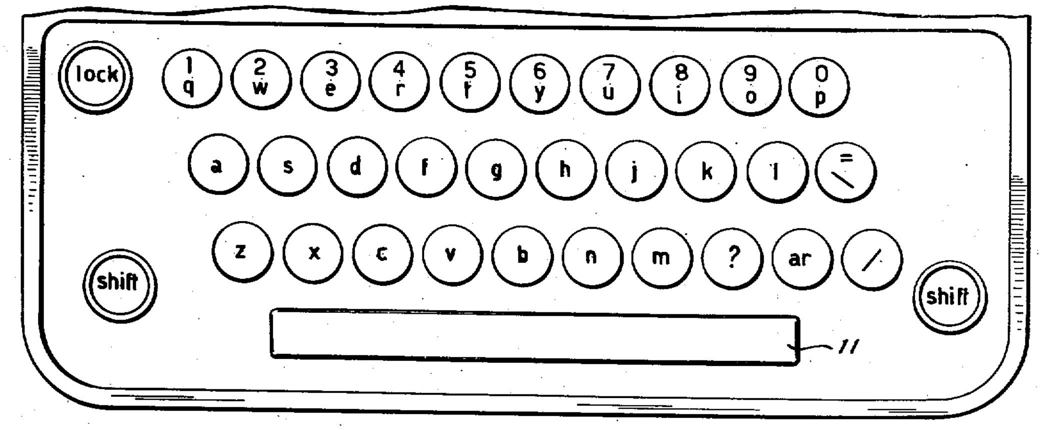
Fig. 4 is a schematic view of the keyboard.

The arrangement of the keyboard is shown diagrammatically in Fig. 4. The key levers are arranged in two groups, on opposite sides of the center of the machine, and are pivoted on an arcuate pivot bar 2 which is secured in the frame 1. The rear ends 5 of the key levers pass under and beyond a universal bar 6, hereinafter described. There are two universal bars 6, one overlying the key levers on each side of the center of the machine.

Figure 3:
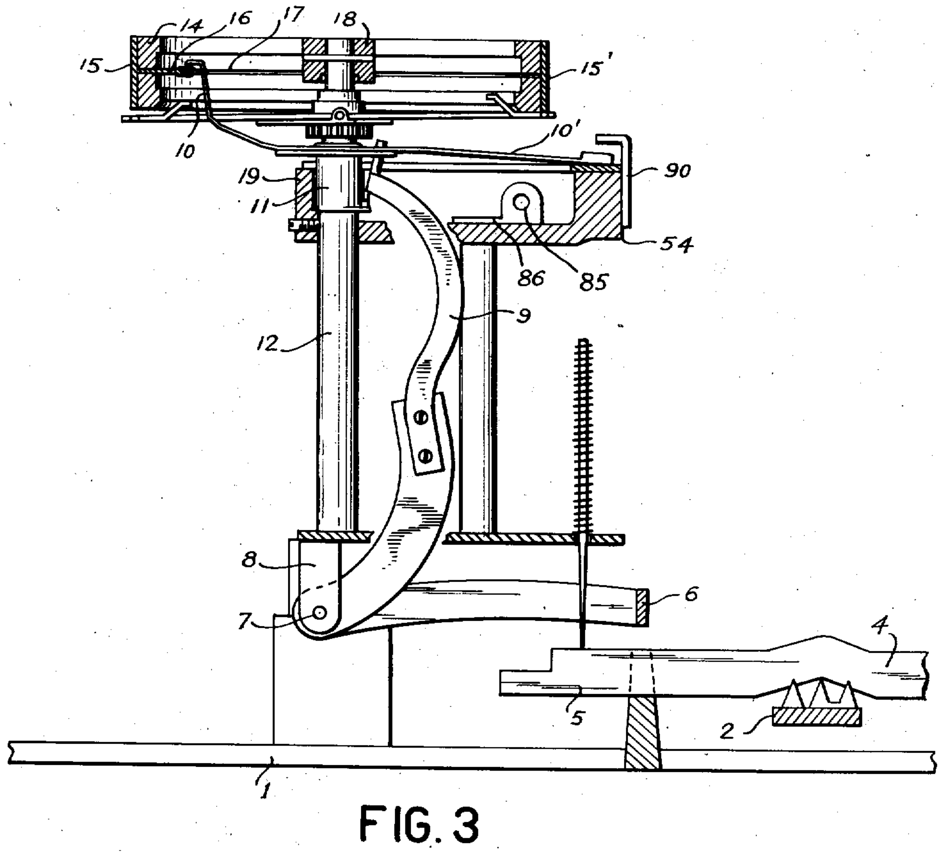
Fig. 3 is a vertical section through the type-selecting device, taken in general on line 3—3 of Fig. 1.

Inasmuch as the structure of the universal bars 6 and connecting mechanism is similar, a description of one is sufficient, it being understood that each acts through intermediate mechanism to move a type shuttle 15 or 15′ to the right or left relative to the printing point, at which the midpoint of the shuttle normally stands. The universal bar 6 (see Fig. 3) comprises a bail-like frame pivoted on a shaft 7 secured in a stationary bracket 8. An upstanding arm 9 is rigidly secured to the bar 6 and acts upon a shuttle arm 10 to oscillate it about a shaft 12 and position the type shuttle 15 or 15′ so that the symbol corresponding to the depressed key will be brought to the printing point for reception of the printing hammer stroke, as hereinafter described. The above-described mechanism in arrangement is in general the same as that disclosed in the patent to Trego No. 1,967,273 of July 24, 1934, to which reference is made for a more detailed description of this conventional arrangement.

While the mechanism for type selection is in general similar to that of the above-mentioned patent to Trego, the shuttle arm 10 has a modified mounting in the machine which permits ready disengagement from its connection with either of the type shuttles 15 or 15'. The two type shuttles 15 and 15' are mounted on a stationary circular anvil 14 supported by a fixed shaft or column 12. The column 12 rotatably mounts a sleeve 11 which constitutes the pivot for oscillation of the arm 10. The sleeve 11 is not only oscillated on the shaft 12, but also reciprocated thereon by means of a lug or flange 11'. The sleeve 11 passes through an aperture 19 in the main frame 1, which aperture has an internal circumferential groove (not shown) to permit the flange 11' to be oscillated about the axis of the shaft 12. The aperture 19 also has an axial groove on one side to permit the flange 11' to be reciprocated. The purpose of this modification of the type selection mechanism will be apparent from the following description.

*Key shift mechanism*

The typing of telegraphic code symbols of the dot-and-dash character requires that the various symbols be of lengths corresponding to the groups of dots and dashes which compose them. They have, therefore, various lengths not reducible to the uniform letter spacing of ordinary typewriting machines. When embodying such type in a machine using a type shuttle, it has been found expedient to space the type at equal angular distances on the shuttle, as is usual in the "Varityper," and to arrange the normally longitudinal dimension of the type along vertical lines. This construction makes it impracticable to accomplish the function of shift keys by raising or lowering the shuttle axially, as heretofore, to bring a different type case into position. Instead of raising or lowering the type shuttle as in the usual "Varityper," first and second type shuttles 15 and 15' are made use of, which are shifted horizontally around the anvil 14, thereby removing one shuttle from the printing point and substituting the other therefor; which shifting of shuttles is accomplished through the operation of the usual shift keys.

Figure 1:
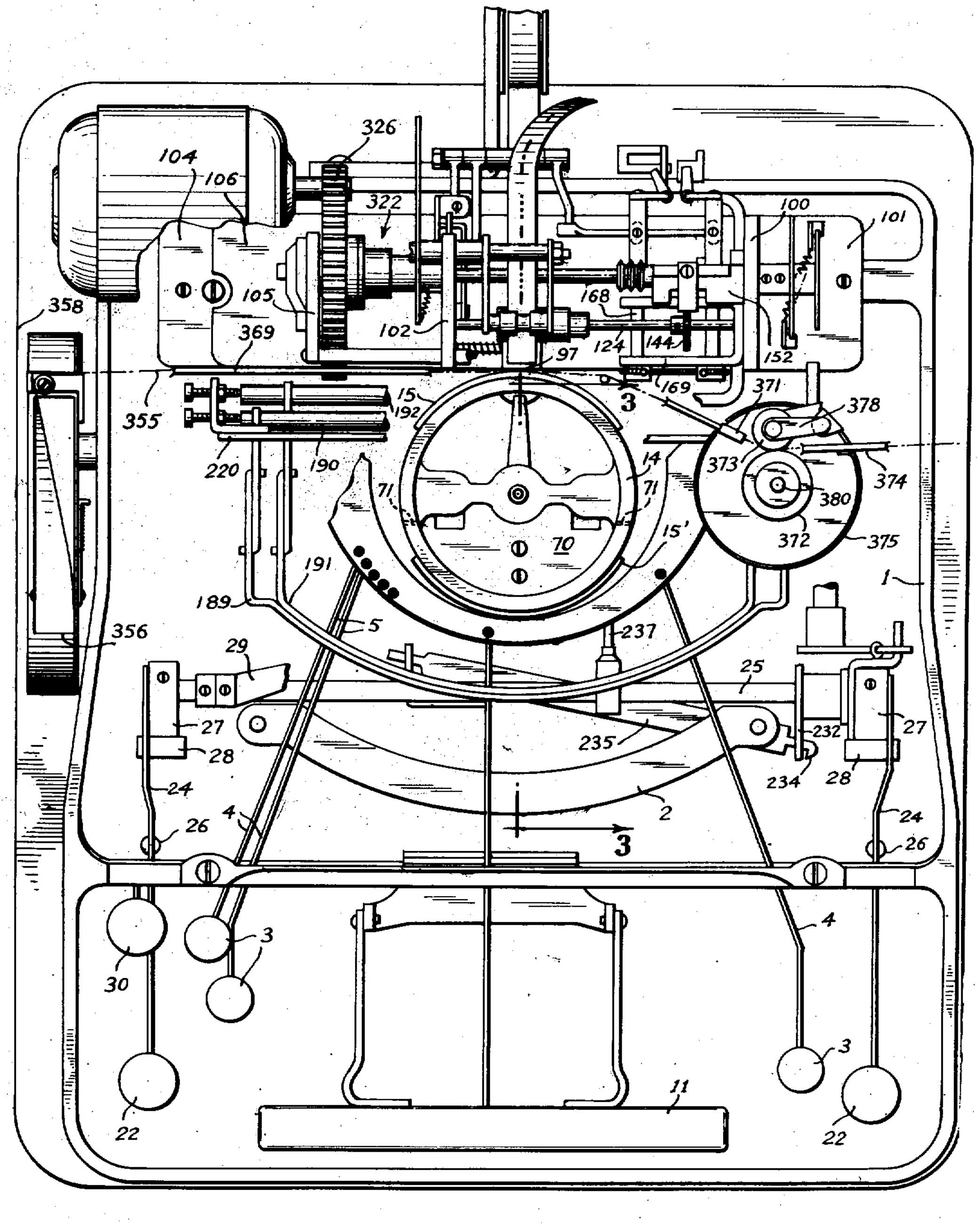
Fig. 1 is a top plan view of the code writing machine, having parts omitted and other parts broken away to show the general arrangement of the operating parts.

Referring to Fig. 1, it will be seen that the shift keys 22 are provided with key levers 24, which are loosely supported on a rock shaft 25, mounted for oscillation in the sides of main frame 1. The shift key levers 24 are limited in their downward movement by stop screws 26, and oscillate the shaft 25 by means of arms 27 projecting from said shaft, each arm 27 having an engaging portion 28 extending under the shift key levers 24 so that depression of the key lever 24 oscillates the shaft 25. The shaft 25 also has an arm 29 projecting therefrom at the left side of the machine and connected with a mechanism for shifting the shuttles about the anvil 14 (see Figs. 1 and 2). The arm 29 is pivotally ocnnected by means of a link 31 (see Fig. 2) to an arm 32 projecting from a vertical rock shaft 34, which has a driving element for interchanging the first and second shuttles 15 and 15' about the anvil 14. A conventional shift lock 30 may be used, if desired, to hold the left-hand shift key lever in its depressed position, thereby holding the entire shuttle-shifting mechanism in the position to which it has been moved by depression of the shift key lever 24.

The shuttles 15 and 15' (see Fig. 5), having respective fins 16 and 16' projecting from the back thereof, are positioned on the periphery of the anvil 14 with the fins lying in a circumferential slot 17 in anvil 14. Both of the shuttles have, on their bottom edges, engaging means such as the lugs 35, 35' projecting downwardly. The shuttle 15 carries on its outer face the printing type for all symbols to be printed normally; that is, when the shift keys are not being used. The second shuttle 15' carries type for symbols to be printed when the shift keys are depressed.

Figure 7:
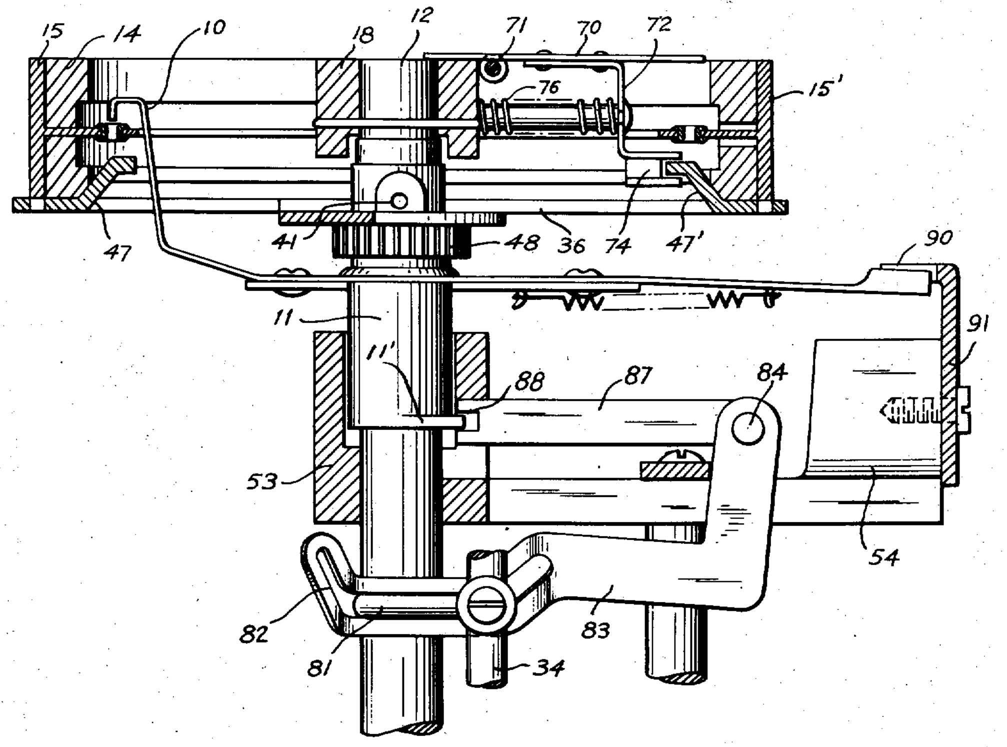
Fig. 7 is a view similar to Fig. 5 but showing parts thereof in a different operating position.
Figure 8:
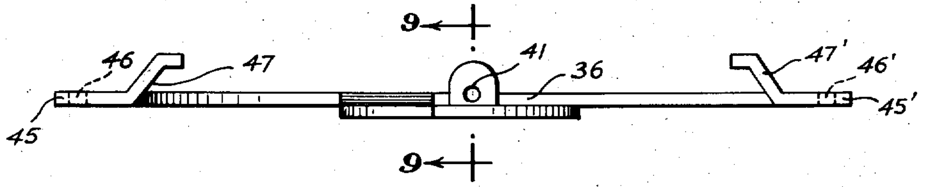
Fig. 8 is an elevational view of the shuttle-shifting yoke shown in plan in Fig. 11.
Figure 9:
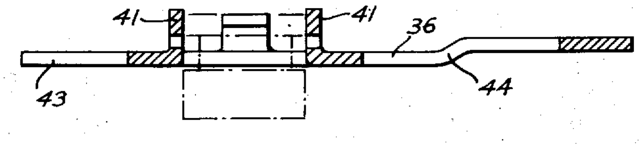
Fig. 9 is a sectional view of the shuttle-shifting yoke taken in general on line 9—9 of Fig. 8, showing the pivotal connection of the shifting pinion to the yoke, and showing in dot-and-dash lines the pinion positioned in the yoke.

A yoke 36 which may be formed of sheet metal (shown in Figs. 6, 7, 8 and 11) is provided for cooperation with the shuttles to accomplish the shifting operation. The yoke 36 is an arcuate member, preferably of substantially 180° in extent, and is of such radius as to conform to the periphery of the circular anvil 14, about the center of which it oscillates. An arm 37 (see Fig. 11) of the yoke 36 extends parallel to and spaced slightly from the middle radius of the yoke 36 and has at one side an enlarged rounded portion 38 concentric with the yoke. The enlarged portion 38 has an elongated opening 40 therein at the center of the yoke 36. The longer diameter of the opening 40 coincides with the line joining the extremities of the yoke 36, and the shorter diameter is perpendicular thereto, passing through the center of the yoke. Upstanding lugs 41 project from the edge of the opening 40 at the terminals of the shorter diameter and are apertured for the reception of pivot pins 42. The arm 37 is offset from the plane of the yoke 36 by an angular portion 44 so that the axes of pins 42 coincide and lie in the plane of the upper surface of the yoke 36 (see Figs. 8 and 9). The arm 37 has an extension 43 projecting beyond the enlarged portion 38. A pinion 48 (see Figs. 5, 6 and 7) is mounted in lugs 41 of the yoke 36 by means of the pins 42 and has a central bore for the reception of the shaft 12 upon which it is adapted to oscillate and reciprocate, thereby oscillating and reciprocating the yoke 36. The yoke 36 is provided with tongues 47 and 47' which extend inwardly and upwardly (see Figs. 5 and 7).

Figure 5:
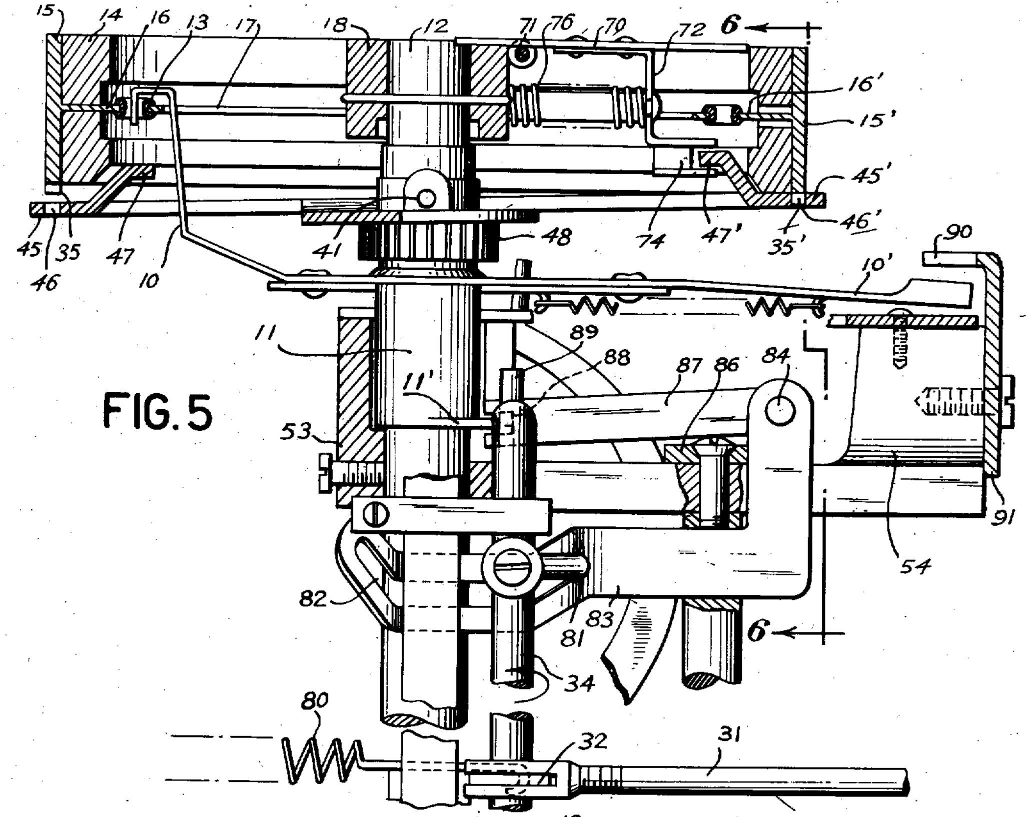
Fig. 5 is an elevation of the shuttle shifting mechanism viewed from the left side of Fig. 1, partly in section taken generally on line 5—5 of Fig. 11, with parts omitted and other parts sectioned for clearness of illustration.

Projections 45 and 45' are formed at the ends of the yoke 36, extend outward, and have suitable means for engaging the shuttles 15 and 15', such as apertures 46 and 46', to receive lugs 35 and 35' on the bottom edges of shuttles 15 and 15'. As shown in Fig. 5, the projection 45' is in engagement with the lug 35' of shuttle 15', which lug extends into the aperture 46', while the projection 45 is shown disengaged from the lug 35, the yoke having a slightly tilted position relative to anvil 14. Engagement of the projection 45' with the lug 35' of the second shuttle 15' serves to retain that shuttle in the fixed position on anvil 14, while the first shuttle 15 is free to be moved about the anvil 14 within a limited arcuate range under control of the key levers 24 and the shuttle arm 10 to bring the selected type to the printing point. Thus, the shuttle 15, in its normal position, is free to be moved to the right and left about the axis of the anvil 14 while the shuttle 15' is immovably locked in position by the engagement of the yoke 36 with the shuttle 15'.

Figure 6:
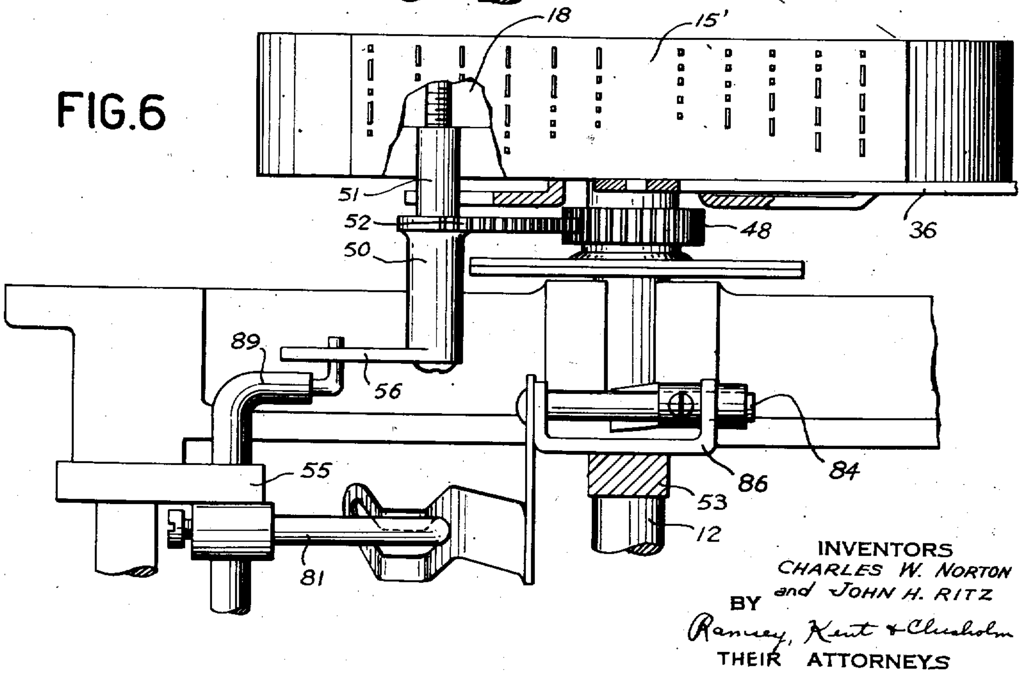
Fig. 6 is an elevation and section taken generally on line 6—6 of Fig. 5 of the mechanism shown in Fig. 5 viewed from the front of Fig. 1, showing parts omitted from Fig. 5.
Figure 10:
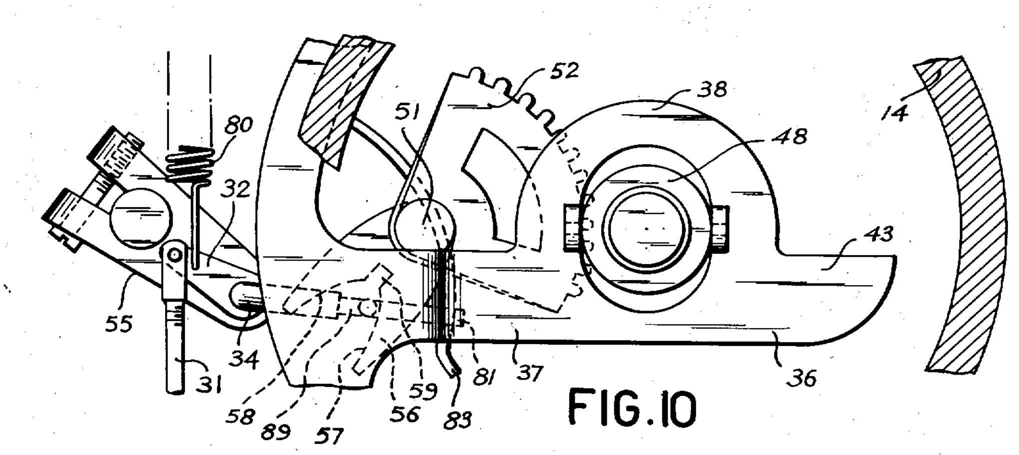
Fig. 10 is a detail plan view of mechanism for operating the shifting pinion.
Figure 11:
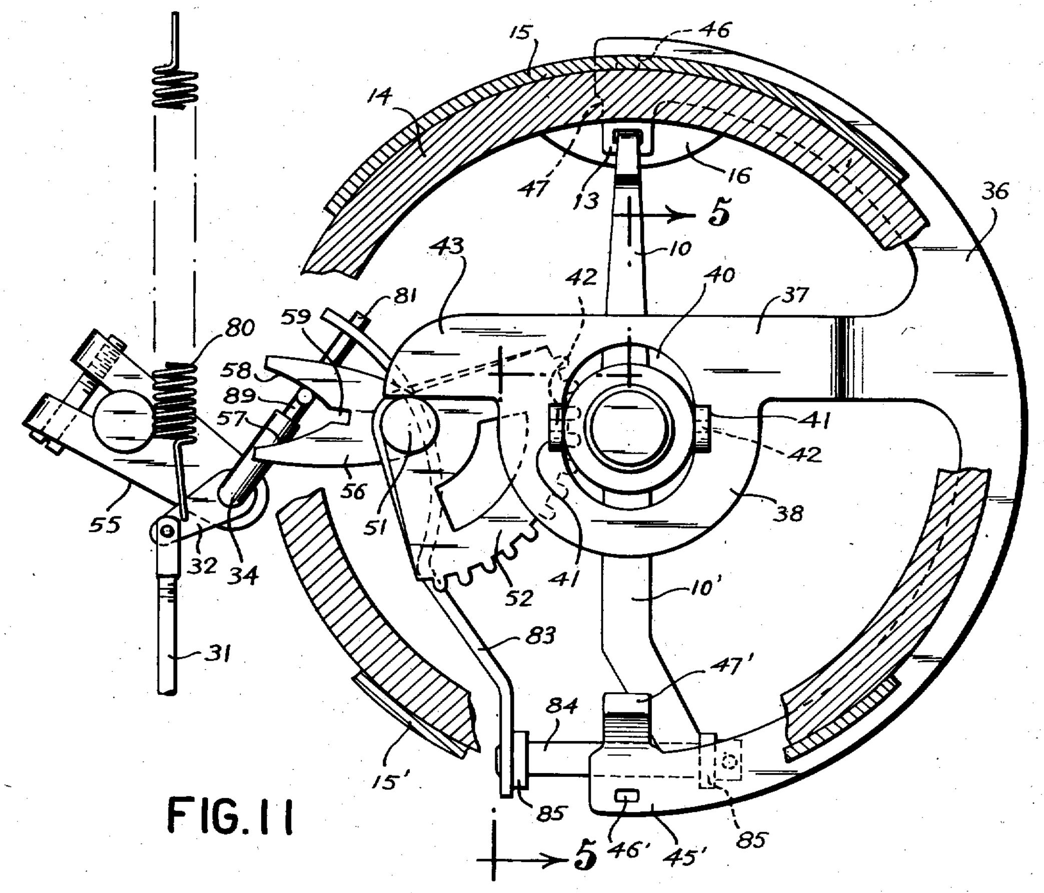
Fig. 11 is a similar view of the parts shown in Fig. 10 and related parts operated thereby, in a different operating position.

The pinion 48, which is connected to the yoke 36, can oscillate only within the limitation imposed by that yoke, 180° in the form shown. To produce that oscillation, a segment sleeve 50 (Fig. 6) is journaled on a stub shaft 51 secured in the underside of a fixed cross arm 18, and carries a segment gear 52, which meshes with the pinion 48. As shown in Figs. 6, 10 and 11, a cam fork 56 projecting from the sleeve 50 is the operating arm therefor.

The yoke 36 is retained in engagement with the shuttle 15′ and out of engagement with the shuttle 15 when in the normal position by means of a resilient spring plate 70 (see Fig. 5) which is pivoted by pins 71 on an axis parallel with the cross arm 18. The spring plate 70 has a fork bracket 72 secured to the underside thereof and adapted to engage either of the tongues 47 or 47′ of the yoke 36 when positioned adjacent a fork 74 at the extremity of the bracket. When the yoke 36 is in the position shown in Fig. 5, the pressure of the spring 76 against the bracket 72 biases fork 74 and tongue 47′ upwardly, thereby tilting the yoke 36 and holding it in contact with the anvil 14 adjacent the shuttle 15′. In order to remove the shuttle 15′ from the anvil 14, the yoke adjacent lug 35′ may be depressed by a downward pressure on the spring plate 70, thereby freeing shuttle 15′. Similarly, the shuttle 15 may be removed after actuation of the shift lock 30.

When the projection 45′ is retained in engagement with the shuttle 15′, as in the normal typing position, the weight of the yoke 36 and the pinion 48 causes the projection 45 to drop downwardly out of engagement with the lug 35 of shuttle 15. At the same time, the shuttle arm 10 is held down into engagement with the shuttle 15, a portion thereof passing through an aperture 13 in the fin 16, and is vertically controlled by the shaft 34 and the intermediate mechanism during operation of the printing key.

In order to maintain the shuttle 15 in normal operating position, a spring 80 biases the arm 32 to the left as viewed in Fig. 5, which biases the shaft 34 in the direction of the arrow, clockwise when viewed from the top. The shaft 34, in turn, biases a projecting member 81, which is radial to shaft 34, to the right end of the cam slot 82 in an arm 83 of the bell crank lever composed of the arm 83, a pivot shaft 84 and an arm 87. The arms 83 and 87 are rigidly secured to the shaft 84 which is journaled in bearings 85 in a bracket 86 secured to a projection 54 of the stationary cross arm 53. The conformation of the arm 83 (Fig. 11) is such that the portion thereof containing the cam slot 82 is curved in an arc concentric with the axis of vertical rock shaft 34. The arm 87 has a forked end 88 engaging the lug 11′ at the lower end of sleeve 11. Thus, the tension of the spring 80 operates to draw and hold the shuttle arm 10 downward into engagement with the fin 16 of the type shuttle 15. In this position, depression of a type key operates in the usual way to oscillate the type shuttle 15 and bring the selected type to the printing point, the yoke 36 offering no hindrance to such movement.

If it is desired to type a symbol positioned on the second shuttle 15′, which requires operation of the shift key, that operation, acting through the arm 29 will draw the link 31 to the right as viewed in Fig. 5 (forward as viewed in Fig. 10), thereby oscillating the shaft 34 in a counterclockwise direction against the bias of the spring 80 and turning the member 81 in a similar direction. This movement of the member 81 (see Fig. 7), acting in the cam slot 82, raises the arm 83, thereby raising the arm 87 of the bell crank lever and the sleeve 11 by means of the fork 88 and the lug 11′. By this motion, the sleeve 11 not only lifts shuttle arm 10 out of engagement with the opening in the fin 16 of shuttle 15, but the sleeve 11 contacts the pinion 48, lifting the pinion and the lugs 41 to lift the yoke 36. Since the yoke 36 is already in contact with the anvil 14 adjacent the projection 45′, it can rise no higher at that point but the remainder of yoke 36 will be raised to a horizontal position in which the projection 45 is in engagement with the lug 35 of the shuttle 15 adjacent the printing point, which lug then extends through the aperture 46.

At the same time that the shuttle arm 10 is lifted out of engagement with the fin 16 of the shuttle 15, the opposite end 10′ of that arm is lifted into engagement with a fork 90 on the upper end of a detent 91 secured on the projection 54, thereby accurately positioning and holding the arm 10 against rotary movement. As the member 81 enters the horizontal portion of the cam slot 82, the shuttle arm 10 is held stationary by the interengagement of the fork 90 with the end 10′ of the arm 10. The member 81 may continue to move in the horizontal portion of the cam slot 82 without producing any further upward movement of the shuttle arm 10. The rock shaft 34, however, has an arm 89 fixed to its upper end beyond the bearings 55, the structure and function of which will be apparent by reference to Figs. 6 and 11. During that movement, the arm 89, which is fixed to the vertical rock shaft 34 and rotates therewith, passes idly in a counterclockwise direction over the surface 57 of the cam fork 56 (see Fig. 10) which surface 57, during that movement, is concentric with the axis of the rock shaft 34. When the member 81, by its movement, has freed the shuttle 15 from the shuttle arm 10 and connected the yoke 36 with both of the shuttles 15 and 15′, the vertical portion of arm 89 enters the notch 59 in the cam fork 56, during which time further movement of the member 81 in the horizontal portion of the cam slot 82 is an idling movement.

Upon further movement of the arm 89 in a counterclockwise direction, the vertical portion of that arm enters the notch 59 and contacts the sides of that notch to oscillate the segment sleeve 50 and the segment gear 52 in a clockwise direction. This movement oscillates the pinion 48 in a counterclockwise direction, oscillating the yoke 36 and the shuttles 15 and 15′ therewith until the arm 37 of the yoke 36 contacts the opposite side of the stub shaft 51 and the arm 89 passes into contact with the curved surface 58 of the cam fork 56, which surface has now become concentric with the rock shaft 34.

During this movement of the yoke 36 through 180°, it has been held into close proximity with the anvil 14 by means of the arm 83, the arm 87, the fork 88, and the pinion 48, so that the shuttles 15 and 15′ have been continuously engaged by the projections 45 and 45′ and shifted to diametrically opposite sides of the anvil 14, thereby interchanging their positions relative to the printing point. Further movement of the arm 89 causes no change in the angular position of the yoke 36, but securely locks it in position while passing idly over the curved surface 58. Member 81, engaging the inclined portion of the cam slot 82, depresses the arm 83 and, through the intermediate action heretofore described, lowers the sleeve 11, thereby engaging the shuttle arm 10 with the aperture in fin 16′ of the second shuttle 15′ and lowering the yoke 36, thereby disengaging projection 45′ from shuttle 15′ and leaving it free to be oscillated by the shuttle arm 10 in the typing operation.

Figure 18:
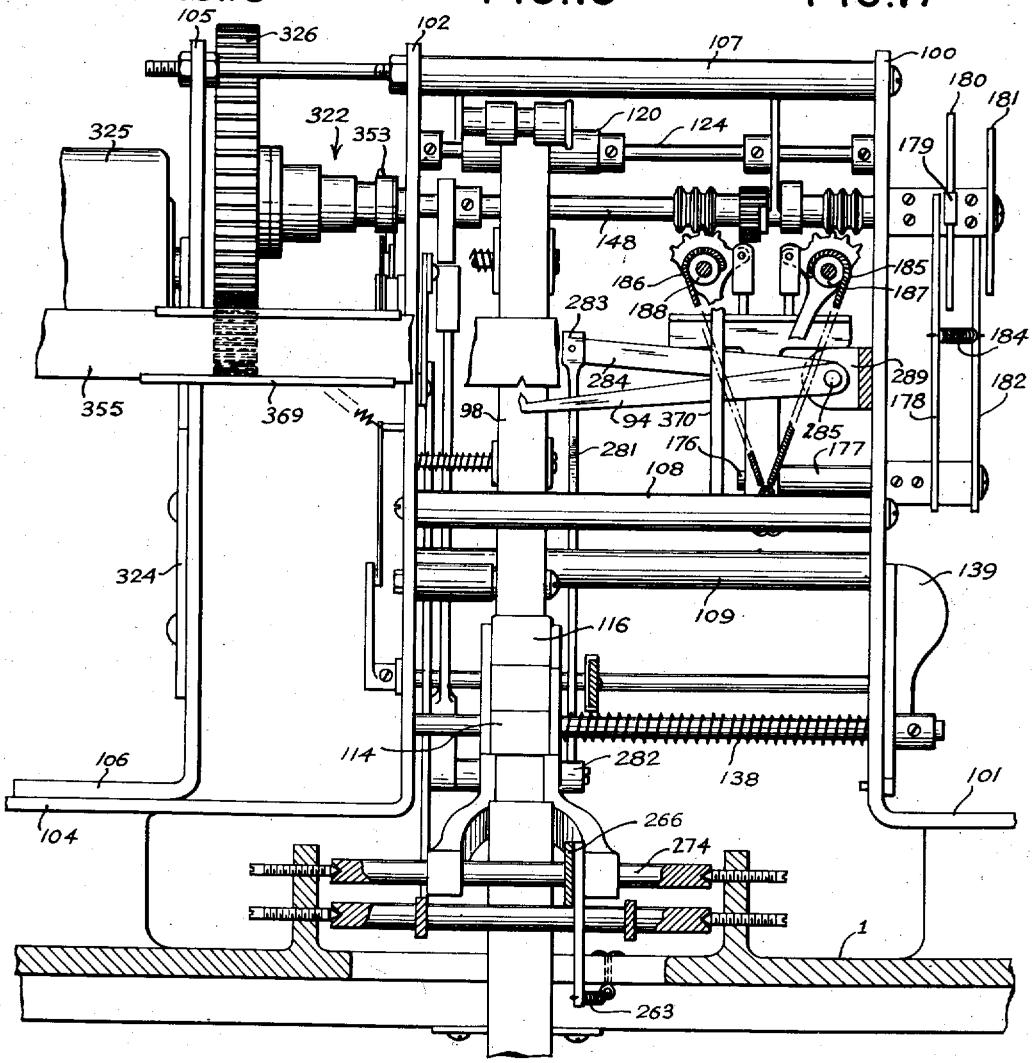
Fig. 18 is a front elevation, partly in section, of the mechanism for feeding the message tape past the printing point, and showing the type locking device.

To insure accurate positioning of the type characters on the message tape, it is desirable that the type be mechanically positioned and held immovable at the instant the printing hammer strikes to make the impression. Accordingly, a notch 92 (see Figs. 12 and 13) is provided in the lower edge of the printing shuttles 15 and 15' corresponding to each symbol. A type lock 94 (Figs. 12, 13 and 18) has an upturned portion 95 with an edge or point 96 extending upwardly through the aperture 46 (or 46') in the yoke 36 to enter the appropriate notch 92 at the printing point after selection of the proper symbol, thereby immovably locking the type shuttle 15 or 15' in position at the instant of printing.

*Tape feeding mechanism*

The mechanism for printing and feeding the tape is mounted in the framework comprising uprights 100, 102 and 105 secured respectively on the frame 1 by foot pieces 101, 104 and 106, and in spaced relation to each other by spacing rods 107, 108 and 109, which framework carries the hammer operating mechanism, the tape feeding mechanism, means for advancing the pigment ribbon and a single rotation clutch 322 for connecting and disconnecting a continuously rotating motor to an intermittently rotated driving shaft 148, the action of the clutch being controlled by the operating keys.

Figure 2:
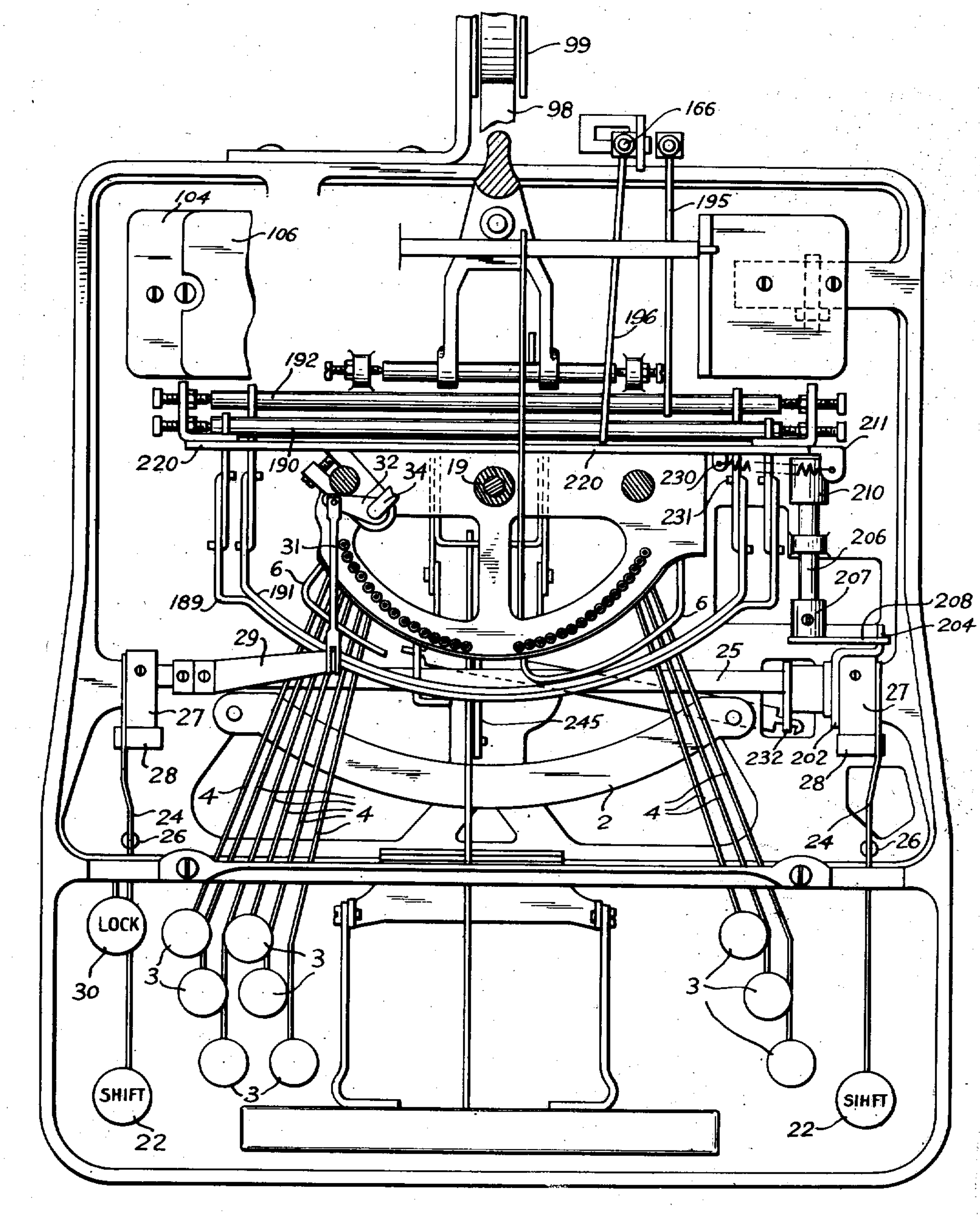
Fig. 2 is a plan and sectional view of the typewriter, being a portion of the view in section taken generally on the line 2—2 of Fig. 37.

A message tape 98 is fed from a reel 99 mounted on the rear portion of the frame 1, as conventionally shown in Fig. 2. Ordinarily the message tape 98 is composed of a good quality paper, but any material suitable for receiving a type message may be used, and the word "paper" when used herein is intended to denote any such material. A bracket 110 (see Fig. 14) is secured to the bottom rear of frame 1 and carries a guide tube 111 in the line of delivery of the tape 98 from the reel 99. A smooth cylindrical body 112 may be fixed to the lower end of the guide tube 111 to provide for smooth passage of the tape. The tape 98 next passes to a tape tensioning device 114 which is secured to a shaft 115. The tensioning device 114 carries a roller 116 over which the tape 98 may pass. A resilient member 117 presses against the roller 116 to provide a frictional resistance against feeding of the tape in order to prevent slack in its passage past the printing point.

Figure 15:
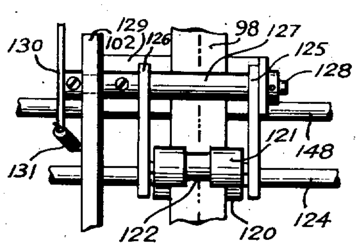
Figs. 15 and 16 are detailed views of the feed rolls for passing the message tape past the printing point.
Figure 16:
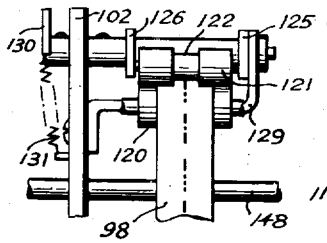

The tape is next passed over guide rollers 118 and 119, below and above the printing point and over a feed roller 120. A pressure roller 121 cooperates with the feed roller 120 to effect a pull on the tape 98 sufficient to draw the tape past the printing point 96 against the tension supplied by the tensioning device 114. The pressure roller 121 (Figs. 15 and 16) contacts the face of the tape bearing the type symbols, and has a circumferential groove 122 in the face thereof to prevent contact of the roller with the printed symbols and consequent blurring thereof.

Figure 21:
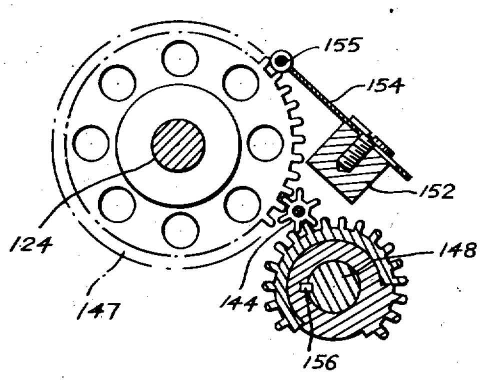
Fig. 21 is a sectional view of the variable gearing taken in general on the line 21—21 of Fig. 20.

The feed roller 120 may be secured on a shaft 124 which is driven by a gear 147 (see Fig. 21), and pressure roller 121 may be mounted in a carrier consisting of spaced arms 125 and 126 secured to a tubular member 127 which may be secured by a set screw to a shaft 128 journaled in the upright 102 and a bracket 129 fixed to the upright. An operating lever 130 is secured to the shaft 128 and permits the bias of the roller 121 against the roller 120 by means of a tension spring 131, or release by manual pressure on the opposite end of the operating lever. The pressure roller 121 may be separated from contact with the roller 120 by means of the operating lever 130 in order to facilitate introduction of the message tape 98 between these rollers, as when inserting a roll of tape in the machine.

The guide rollers 118 and 119 are similar in structure and designed to insure a uniform lateral positioning of the tape 98 relative to the printing point 97, resulting in a uniform positioning of the printed symbol relative to the message tape. These rollers are also so positioned as to cause the tape 98, under the tension to which it is subjected, to present a plane surface parallel with the type at the printing point 97, Fig. 14.

Figure 17:
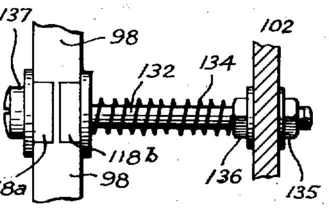
Fig. 17 is a detailed view of one of the guide rollers for the tape feeding mechanism.

The structure of the rollers 118 and 119 is shown in Fig. 17, as viewed from the rear of the machine, the description of the roller 118 applying also to the similar roller 119. The roller 118 consists of two parts 118*a* and 118*b* which are longitudinally movable on a spindle 132, adjustable relative to the upright 102 by means of nuts 135 and 136. The spindle 132 has a head 137 against which the roller part 118*a* is urged under pressure of a spring 134, acting through the roller part 118*b*. By this structure, the edge of the tape 98 adjacent the roller part 118*a* is always in a definite position relative to the upright 102, determined by the adjustment of the spindle 132, any irregularities in the width of the tape 98 being accommodated by the yielding of the roller part 118*b* against the spring 134. As a result, the type symbols will be positioned a uniform distance from the edge of the tape adjacent the roller part 118*a*.

Figure 19:
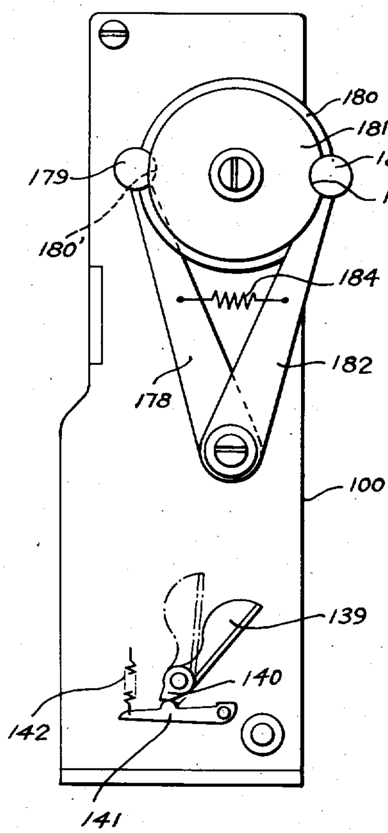
Fig. 19 is a right-side elevational view of the mechanism for stopping the driving shaft at a definite angular position.

As has been stated, the action of the feed roller 120 and the pressure roller 121 is to draw the message tape 98 under tension past the printing point 97, the tension being maintained by the tension device 114 secured on the shaft 115. The shaft 115 may be journaled in the uprights 100 and 102 and is biased by a torsion spring 138 (see Fig. 18) so that pressure is exerted by the roller 116 against the member 117. The shaft 115 may be extended through the upright 100 and have an operating lever 139 secured thereto in order to oscillate the shaft against torsion of the spring 138, thus removing the roller 116 a sufficient distance from the member 117 to permit introduction of the message tape 98 therebetween. The operating lever 139 may have a cam 140 thereon cooperating with a detent 141 maintained in contact with the cam 140 by a tension spring 142 (see Fig. 19). When it is desired to separate the roller 116 from the member 117 to insert the message tape 98, the lever 139 may be moved to the dotted line position, in which position it would be retained by the detent 141 acting on the cam 140.

The operation of the typing keys actuates the mechanism for determining the amount of tape feeding required for the printed telegraphic code symbols, which, as before stated, varies according to the symbol typed. To illustrate the different spacings required, the following spacing table is set forth, a unit being an arbitrarily predetermined movement of the message tape 98.

| | Units |
|---|---|
| Between words | 4 |
| Symbol for e | 4 |
| Symbol for t | 6 |
| Symbol for a | 8 |
| Symbol for d | 10 |
| Symbol for f | 12 |

| | Units |
|---|---|
| Symbol for z | 14 |
| Symbol for j | 16 |
| Symbol for ? | 18 |
| Symbol for 9 | 20 |
| Symbol for zero | 22 |

Figure 20:
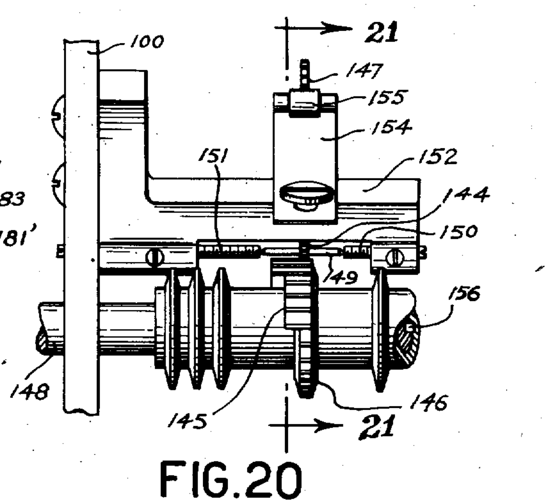
Fig. 20 is a rear elevation of the variable gearing for feeding the message tape.

The spacing occasioned by a symbol is imparted to the tape 98 after the symbol has been typed, and corresponds to the length of the symbol plus the required space between symbols. The mechanism for imparting this spacing of tape 98 is actuated by a driving shaft 148 which makes a single revolution for each symbol printed or spacing made. The feed roller 120 is driven by the shaft 124 through a gear 147 (see Figs. 18, 20 and 21). It will be seen that the function of a pinion 144, hereinafter more fully described, is to rotate the gear 147 on the shaft 124 in the same direction as the shaft 148 upon which the gears 145 and 146 are mounted, the rotation of the gear 147 operating to draw the message tape 98 past the printing point 97. The pinion 144 (see Fig. 20) is mounted on a spindle 149 which may be pointed at each end for cooperation with spindle bearings 150 and 151 supported by a bracket 152 secured to the upright 100. The bracket 152 may have an adjustable resilient detent 154 secured thereon having a roller 155 urged by spring pressure between adjacent teeth of the gear 147, whereby the rotation of that gear is immediately stopped after disengagement of teeth of the gears 145 or 146 or both with the pinion 144 to prevent additional rotation of the feed roller 120 secured to the feed roller shaft 124 due to momentum of the rotating parts.

Figure 23:
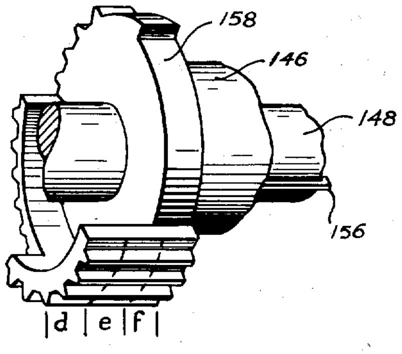
Fig. 23 is a perspective view of another mutilated gear for cooperation with that shown in Fig. 22.
Figure 22:
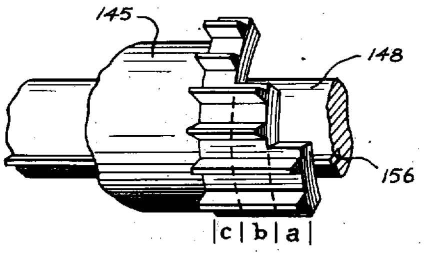
Fig. 22 is a perspective view of a mutilated gear constituting a part of the variable gearing shown in Fig. 20.

The gears 145 and 146 (see Figs. 20 and 21) may be splined or keyed on the shaft 148 by a spline 156 so that they rotate in unison therewith and are capable of individual longitudinal movement on the shaft 148 relative to the fixed plane of the pinion 144. In order to regulate the drive of the feed roller 120, these gears have a pitch which in an unmutilated gear would afford 24 teeth to their periphery, but are so mutilated as to be capable of engagement with the pinion 144 either separately or jointly in tandem, the number of teeth engaging the pinion 144 during a single rotation of the shaft 148 ranging from 4 to 22. The form of the gears 145 and 146 is best shown in Figs. 22 and 23. The gear 145 may be considered as divided into three zones, *a*, *b* and *c*, zone *a* including two teeth, zone *b* including four teeth, two of which are a continuation of those of zone *a*, and zone *c* including six teeth, four of which are a continuation of those of zone *b*, forming a stepped mutilated gear. The gear 146 is also a stepped mutilated gear of three zones, *d*, *e* and *f*, zone *d* having six teeth, zone *e* having twelve teeth, of which six are a continuation of those of zone *d*, and zone *f* having sixteen teeth, twelve of which are a continuation of those of zone *e*. The zones *d* and *e* of the gear 146 project axially beyond the radial face of the hub 158 of the gear, zone *f* extending partially around the periphery of the hub but not axially therefrom. The three zones, *a*, *b* and *c*, of the gears 145 all extend axially beyond the face of the hub 157 of that gear. In consequence of this structure, all the teeth of the gear 145 may be moved axially over the hub 158 of the gear 146 so that any zone, *a*, *b* or *c*, may coincide with and become an extension of any zone *d*, *e* or *f* by relative axial movement. The relative axial movement may be entirely by the gear 145, entirely by the gear 146, or a combination of movements of both the gears.

Figure 24:
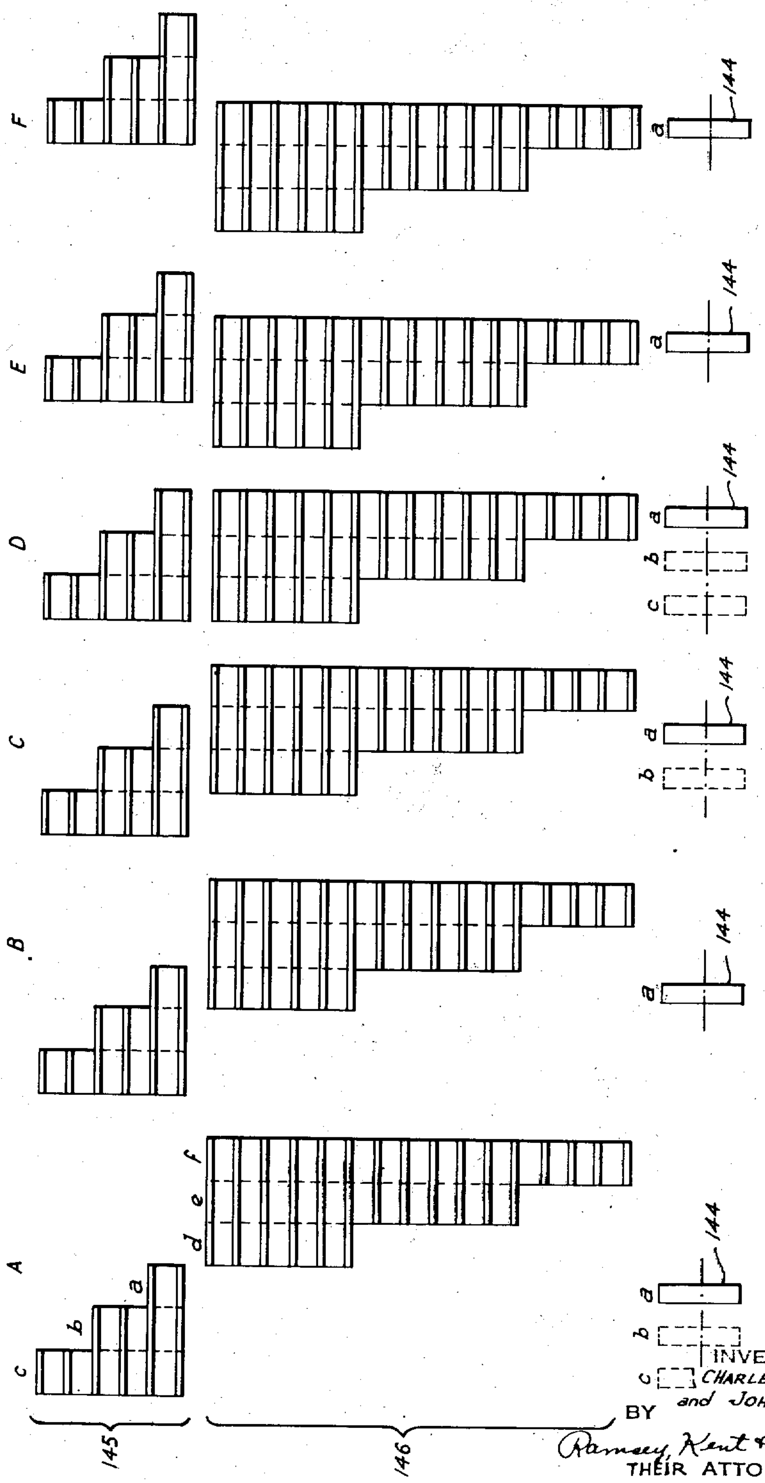
Fig. 24 is a schematic development showing the cooperation of the mutilated gears of Figs. 22 and 23.
Figure 25:
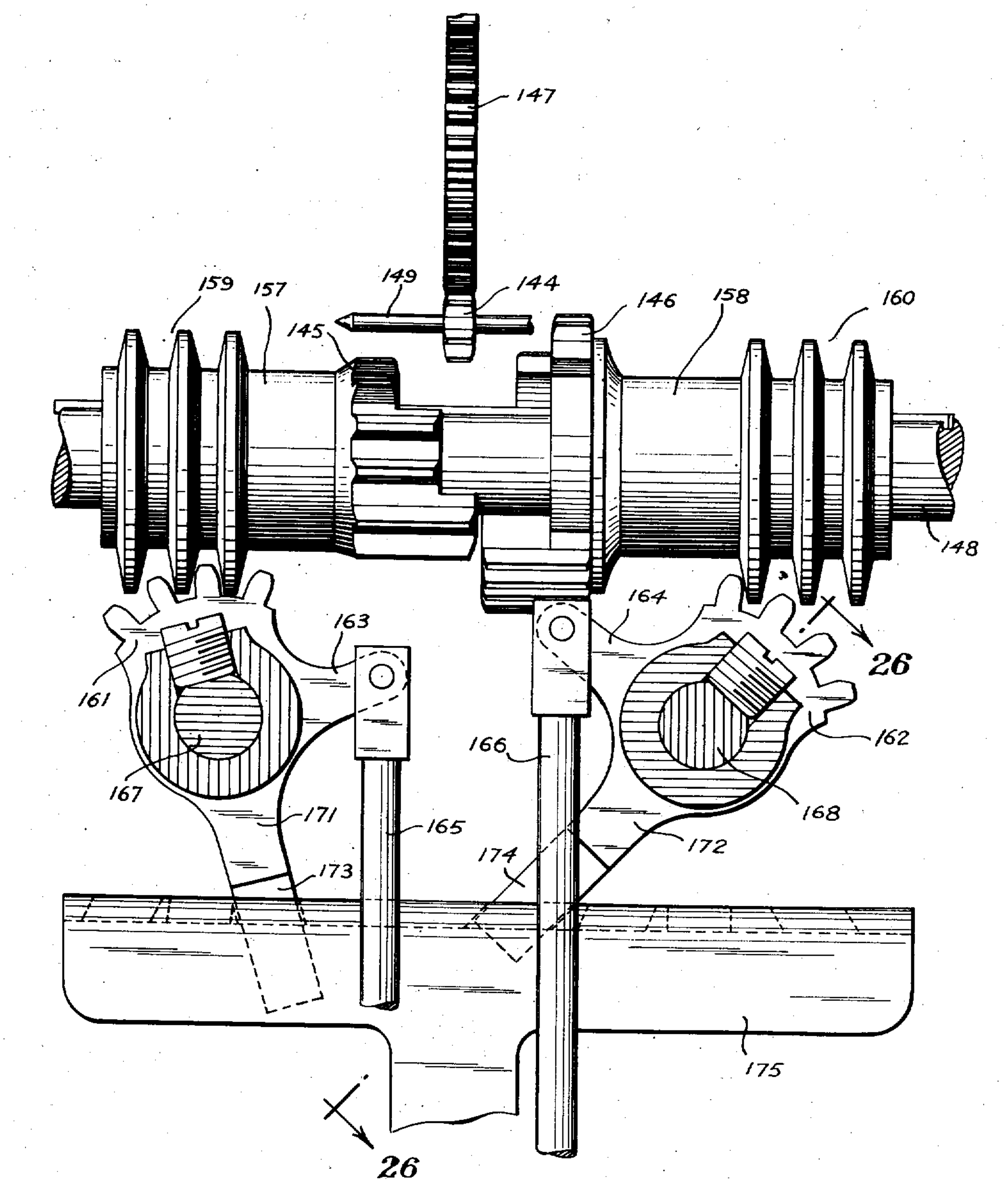
Fig. 25 is an enlarged fragmentary elevational view of the means for shifting the mutilated gears on the driving shaft.

The effect of the axial shifting of the gears 145 and 146 is illustrated diagrammatically in Fig. 24, in which the peripheral teeth of the gears 145 and 146 are represented by a series of horizontal bars, each bar constituting one tooth. In this figure the different combinations or settings of the gears 145 and 146 are designated A, B, C, D, E and F. The settings A, B, C and D involve no axial movement of the gear 145 along the shaft 148. The setting A is the inactive position of the gears relative to each other and to the pinion 144, which pinion is diagrammatically indicated in heavy lines. In operation of the machine, the shaft 148 is not set in motion while the gears 145 and 146 are in the position of setting A for the reason that it is not contemplated that the message tape 98 shall receive any degree of advancement less than that produced by the engagement of the four teeth. Depression of the space bar or printing key which initiates rotation of the shaft 148, always shifts one or the other of the gears 145 and 146 relative to the plane of the pinion. The gear 145 alone may be shifted into position to bring any of the zones *a*, *b* or *c* into the plane of the pinion 144. This provides tape feeding movements obtained from the meshing of four teeth or six teeth with the pinion 144 by axial movement of the gear 145 alone, the gear 146 remaining out of the plane of pinion 144. The settings B, C and D show the three different axial positions produced by the movement of the gear 146 alone from the position of setting A. The setting B brings eight teeth (zones *a* and *d*) into the plane of the pinion 144, and setting C brings fourteen teeth (zones *a* and *e*) into the plane of the pinion 144. The setting D brings eighteen teeth (zones *a* and *f*) into the plane of the pinion 144.

If the relative setting C of the gears 145 and 146 is moved axially as a whole one step to the right, such a movement being equivalent to relative movement of the pinion 144 in the opposite direction, the relative position of the pinion 144 will be, as indicated in dotted lines, in the plane of zone *b*, bringing ten teeth (zones *b* and *d*) into its plane. If the relative setting D is moved axially as a whole one step to the right, bringing zone *b* into the plane of pinion 144, the movement brings sixteen teeth (zones *b* and *e*) into action, and if this setting is moved axially as a whole two steps to the right, bringing zone *c* into the plane of the pinion 144, it brings twelve teeth (zones *c* and *d*) into action.

The settings E and F involve an axial movement of both the gears 145 and 146 from the initial setting A. The gear 146 in the setting E is in the same position relative to the plane of the pinion 144 as in setting D, but the gear 145 is moved one step to the right, bringing zones *b* and *f* (a total of twenty teeth) into the plane of the pinion 144. In the setting F, the gear 146 occupies the same position relative to the pinion 144 as in the settings D and E, but the gear 145 is moved axially until the zone *c* is in the plane of the pinion 144, bringing twenty-two teeth (zones *c* and *f*) into action. With the settings from B to F, every desired combination of teeth may be obtained.

Figures 26, 27, 28:
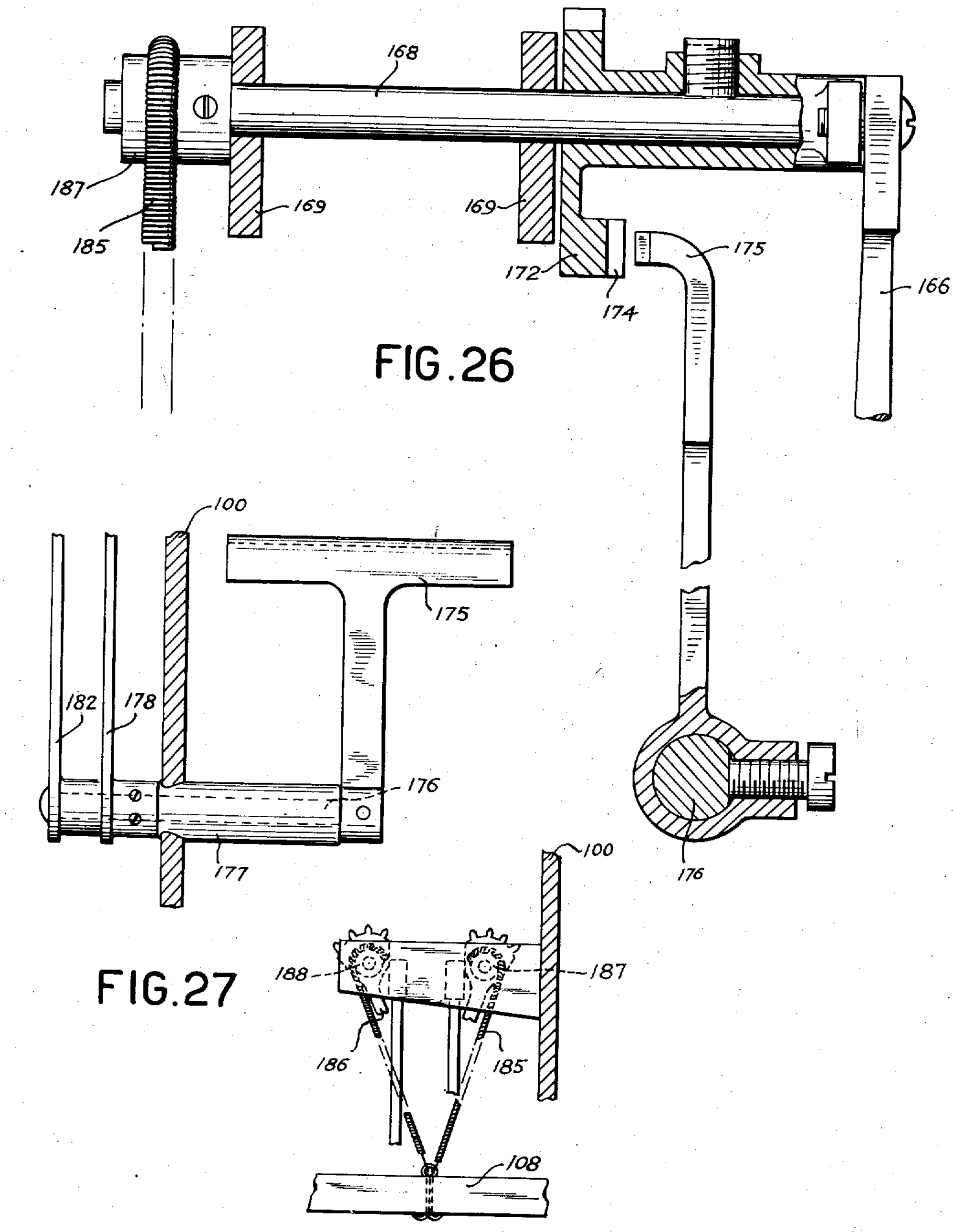
Fig. 26 is a side view of a part of the mechanism of Fig. 25 partly in section taken in general on line 26—26 of Fig. 25.
Fig. 27 is a detail view of the lock for holding the mutilated gears in place after adjustment.
Fig. 28 is a detail view of the structure by which the mutilated gears are biased to normally inactive position.

The shifting of the gears 145 and 146 is obtained by the mechanism illustrated in Figs. 18 and 25 to 33. In order to produce the various combinations above set forth, each gear 145 and 146 has a cylindrical hub 157 and 158 (see Fig. 25) which is provided with a rack 159 and 160, respectively, consisting of several annular ridges or teeth surrounding the hub so that rotation of the hubs will not interfere with their function as racks. The rack 159 is operated by selector quadrant 161 and the rack 160 is operated by the selector quadrant 162. These quadrants are provided, respectively, with arms 163 and 164 to which are connected links 165 and 166, reciprocation of these links serving to slide the gears 145 or 146 individually along the shaft 148 by means of the selector quadrants 161 and 162. A side view of the quadrant 162 is shown in Fig. 26. This quadrant is fixed to a shaft 168 and may be oscillated by the link 166, the shaft 168 being mounted for oscillation in the bracket 169 (see Fig. 1). The quadrant 162 has an arm 172 provided with an edge 174 for engagement with a locking plate 175, which plate serves to positively lock both of the quadrants 161 and 162 in the various positions to which they have been adjusted. The quadrant 161 is provided with a similar arm 171 having an edge 173 for engagement with the locking plate 175. The locking plate 175 is out of contact with the arms 171 and 172 until the quadrants 161 and 162 have been positioned by operation of a printing key (or the space bar) thereby adjusting the mutilated gears 145 and 146 along the shaft 148. The locking plate 175 is movable into locking engagement with the quadrants 161 and 162 by oscillation of a shaft 176 on which it is fixed (see Fig. 27). The shaft 176 is mounted in a bearing 177 secured to the frame upright 100.

The shaft 148 has two discs 180 and 181 fixed thereon (see Figs. 18 and 19) having respective peripheral notches 180′ and 181′ to receive rollers 179 and 183 carried, respectively, by arms 178 and 182. The arm 178 is fixed on the shaft 176 (see Fig. 27) and the arm 182 is pivotally mounted thereon, the free ends of these arms being urged towards each other by a tension spring 184. These arms are so positioned that the rollers 179 and 183 simultaneously enter notches 180′ and 181′, thereby serving to stop accurately rotation of the shaft 148 at the same angular position at the end of each revolution. This mechanism does not prevent commencement of rotation of the shaft 148 under power drive.

As a result of the connection of the locking plate 175 with the arm 178 carrying the roller 179, rotation of the shaft 148, together with the disc 180 fixed thereto, causes the roller 179 to rise out of the notch 180′ in the disc 180, oscillating the arm 178, shaft 176 and the locking plate 175 to engage the arms 171 and 172 and lock both of the quadrants 161 and 162, thus securing the mutilated gears 145 and 146 in the position to which they have been adjusted by depression of an operating key or the space bar.

The selector quadrants 161 and 162 are biased by springs 185 and 186, stretched around collars 187 and 188 on shafts 167 and 168, respectively, tending to rotate these shafts in opposite directions (see Figs. 18 and 28), thereby producing movement of the mutilated gears 145 and 146 away from each other into their normally inactive position. The springs 185 and 186 may be attached to the mechanism in any suitable manner; they are shown as attached to the spacing rod 108 of the frame for the tape feeding mechanism.

Generally U-shaped pivoted universal bars or bails 189 and 191 are provided for producing a reciprocation of links 166 and 165 to shift the gears 146 and 145. There is a separate universal bar or bail for the adjustment of each of the gears (see Figs. 29 and 30). The free ends of the bail 189 are fixed at each end to a shaft 190, and of the bail 191 to a shaft 192, so that upward or downward movement of the front portion of either bail oscillates its cooperating shaft. The shaft 190 has a rearwardly extending arm 196 secured thereto, and the shaft 192 has a similar rearwardly extending arm 195. The arm 196 is connected with the link 166 by means of a pin 197 positioned in a cam slot 198 formed in a cam plate 199 secured on the lower end of the link 166 (see Fig. 30), its oscillation acting through the link 166 to shift the gear 146. The arm 195 is connected with the link 165 by a pin 200 passing through the end piece 201 secured to the lower end of the link 165 (see Fig. 31) and its oscillation acts to shift the gear 145 by means of the link 165. Inasmuch as the gear 145 is normally so positioned that zone *a* is in the plane of the pinion 144, it is necessary to move the gear 145 through only two zones (*b* and *c*) to produce its full contribution to a maximum feed of the message tape 98. Since the gear 146 is normally out of the plane of pinion 144, it is necessary to provide movement through the space of three zones (*d*, *e* and *f*) to produce its full contribution to the maximum speed of the message tape 98.

In order to produce an appropriate vertical movement of one or both of the rods 166 and 165 by movement of the printing key, each bail is acted upon to a degree appropriate to the spacing required by the symbol to be printed. The depression of a printing key 3 causes elevation of the opposite end 5 of the key lever 4, which elevation may lift to a greater or lesser degree the front portion of one or both of the bails 189 and 191 which are positioned immediately above the ends 5 of the key levers, thereby oscillating one or both of the shafts 190 and 192. Space is provided between the ends 5 of the key levers 4 and the lower surface of the bails 189 and 191, different amounts of space being provided between the bails and the various key levers by varying the contour of the bottom edge of the bails. In order that one of the gears may be unaffected by depression of a particular printing key (for example, the gear 145 by the x key), the bottom edge of the bail 191 is cut away so deeply over the x key lever that the end 5 thereof does not contact the bail to lift it. In order to shift either gear to the greatest extent by depression of the printing key (for example, the gear 146 by the x key), the bail 189 is not cut away at all over that particular key lever and hence is lifted to the greatest extent which is sufficient to move the gear through two zones (*d* and *e*). In the example chosen (the symbol for x) it will be seen by reference to Fig. 24 (C) that zone *e* of the gear 146 comprising twelve teeth is moved into the plane of pinion 144 while the position of the gear 145 is unchanged, leaving zone *a* comprising two teeth in the plane of pinion 144. As a result, twelve teeth increased by two teeth, or fourteen teeth, would be effective to rotate the pinion 144. This is true also for letters c, o, p and z and numerals 4 and 6.

Upon depression of the d key, each of the bails 191 and 189 is lifted a distance sufficient to move the mutilated gears 145 and 146 through one zone, bringing the zones *b* and *d* into the plane of the pinion 144 to rotate it by ten teeth. In the same way, actuation of the m key and of the u key produces a spacing of ten teeth. Depression of the keys for b, f, g, k, l, v and w brings zones *c* and *d* into the plane of the pinion 144, actuating it by twelve teeth.

Depression of the space bar does not affect the bail 189, which is cut away most deeply over the space bar 11, and, therefore, it does not affect the gear 146 but does affect the bail 191 which shafts zone *b* on the gear 145 into the plane of the pinion 144 to rotate that pinion by four teeth, the gear 146 remaining inactive.

Figure 29:
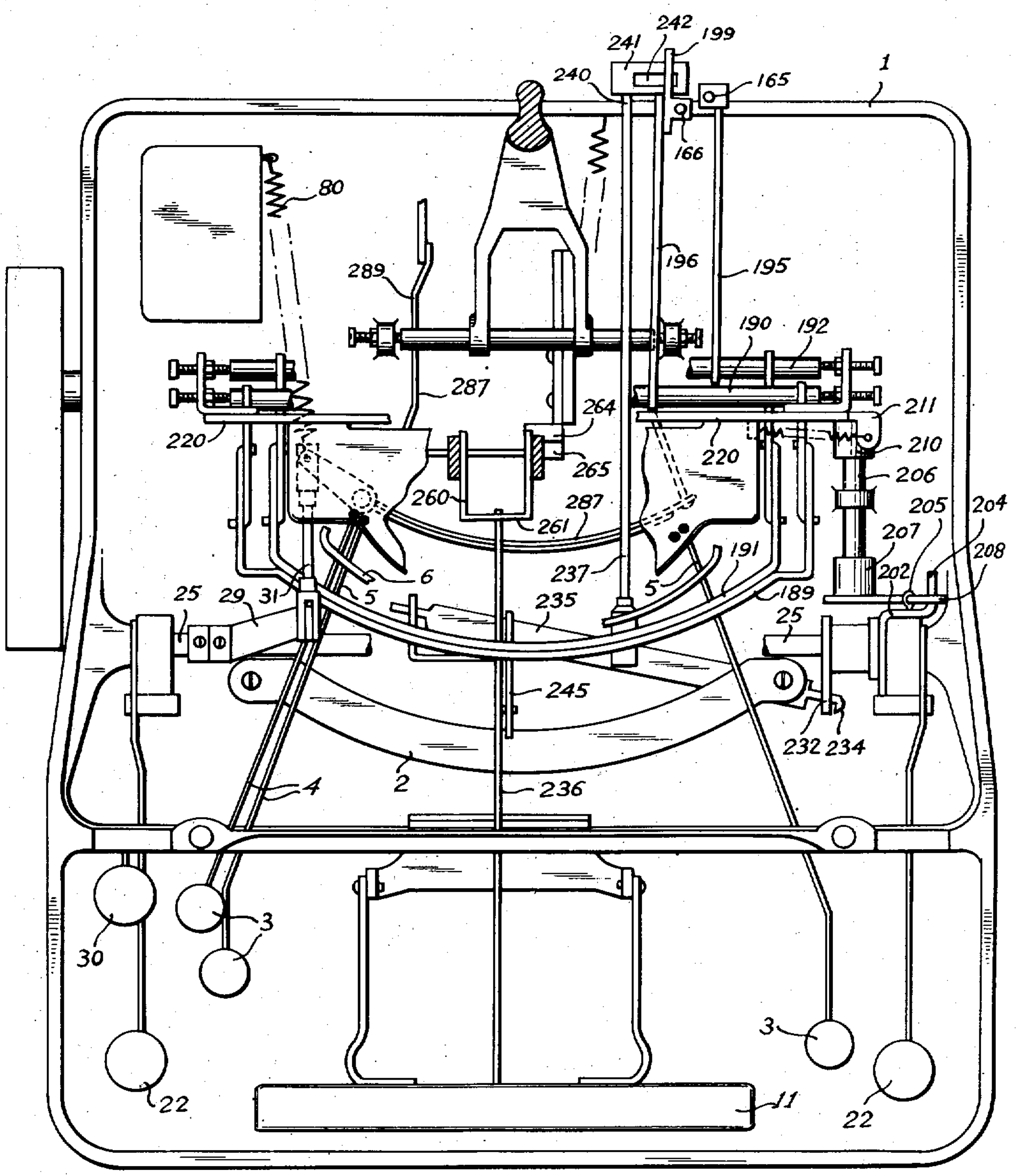
Fig. 29 is a plan view showing the lower linkage of the machine and showing the mechanism by which tape feeding control by the universal bars is modified by action of the shift keys.
Figures 30, 31, 32:
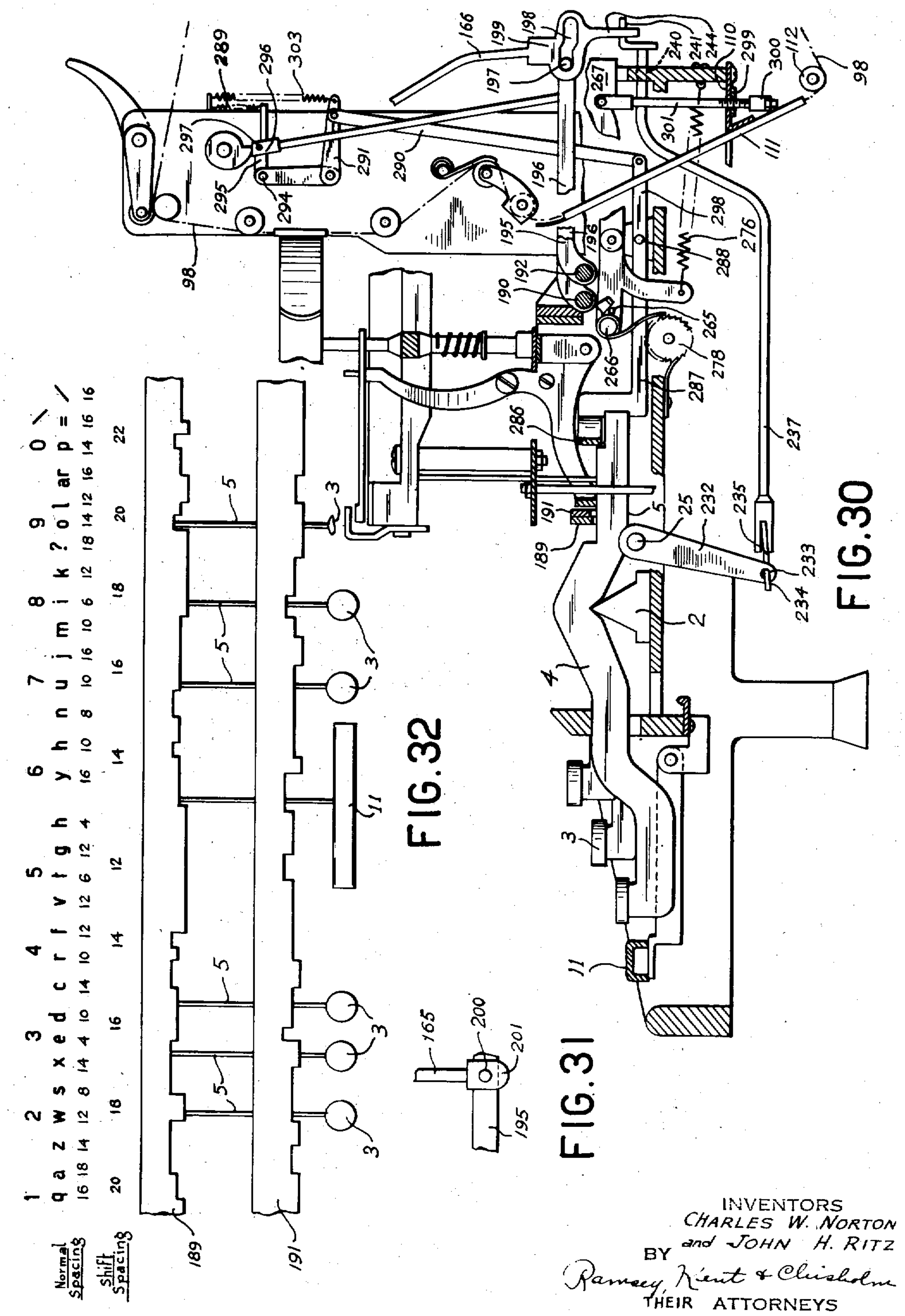
Fig. 30 is a left-side elevation, partly in section, showing the means by which the type keys and space bar control the printing and tape feeding mechanism and showing details of the mechanism.
Fig. 31 is a detail of linkage for the tape feeding mechanism, which is hidden in Fig. 30.
Fig. 32 is a schematic illustration of the essential structure of the tape feed controlling universal bails of Fig. 30.
Figure 33:
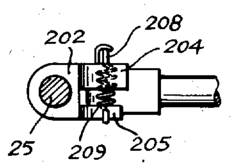
Fig. 33 is a detail view of a portion of the shift key linkage shown in Fig. 29, whereby lost motion is avoided.

Depression of a shift key 22 materially alters the effect of depression of a printing key on the bails 189 and 191. This is accomplished by a lateral shifting of the bails 189 and 191, and mechanism connected therewith, to the left, as viewed in Figs. 2 and 29. As has been hereinbefore described, depression of a shift key 22 oscillates the rock shaft 25 and an element 202 fixed to the rock shaft 25, which element is bent at a right angle to extend a short distance parallel with the axis of the rock shaft, and then again bent at a right angle to form a finger 204. Referring to Figs. 29 and 33, it will be seen that a short prong 205 extends parallel with the finger 204.

A rock shaft 206 is mounted for rotation in bearings on the main frame 1 and has its axis perpendicular to the axis of rock shaft 25. The shaft 206 is provided with a collar 207 fixed thereon which carries a finger 208 extending over and contacting the finger 204. A tension spring 209 is connected between the prong 205 and the finger 208 (see Fig. 33), whereby finger 208 is maintained in constant contact with the finger 204, thus communicating oscillatory movement of the shaft 25 to the shaft 206 without any lost motion. The shaft 206 has a collar 210 fixed thereon having a vertical arm 211 adapted to shift the bails 189 and 191 laterally. This is accomplished by laterally shifting a bar 220 on which the bails 189 and 191 are mounted.

Figure 35:
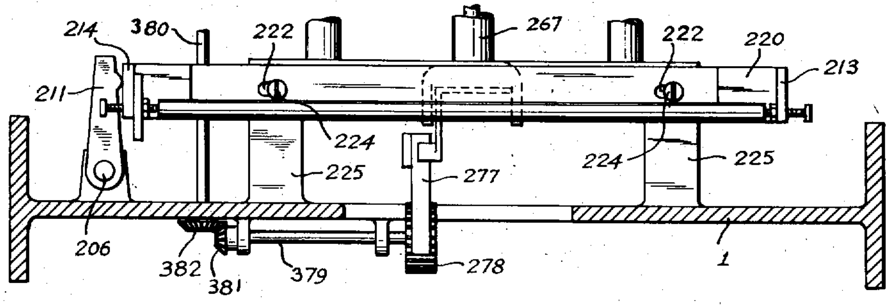
Fig. 35 is a top plan view of the mechanism of Fig. 34.
Figure 36:
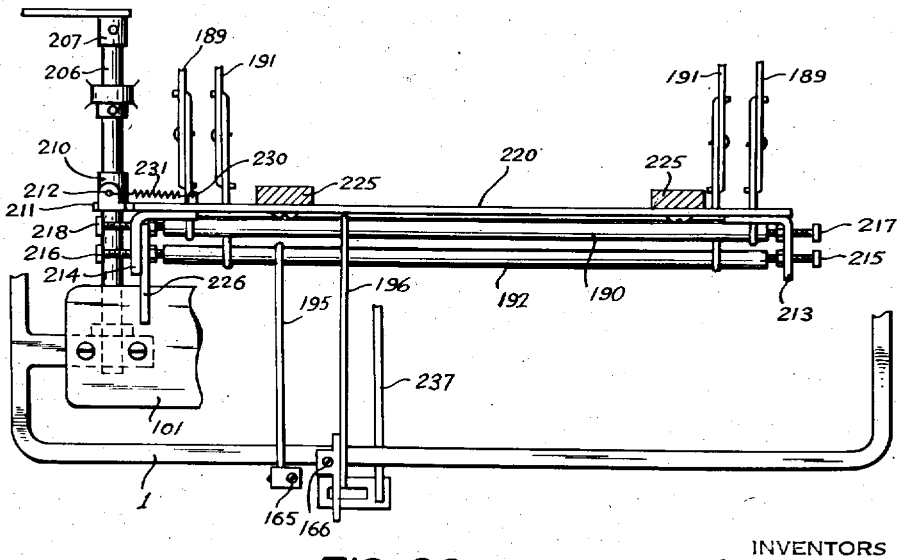
Fig. 36 is an end elevation of the mechanism shown in Fig. 35.

The shafts 190 and 192 are mounted in a frame consisting of the bar 220 and brackets 213 and 214 supporting adjustable pivot screws 215, 216, 217 and 218 mounting the shafts. The bar 220 has two longitudinal slots 222 through which screws 224 may pass into two uprights 225 on the frame 1, thus forming bearing or guide pins to permit reciprocable movement of the bar 220. The end bracket 214 (Figs. 35 and 36) has an engaging element 226 resting on the foot piece 101 of the upright 100 to aid in guiding reciprocation of the bar 220, thus relieving the screws 224 of undue strain.

Figure 34:
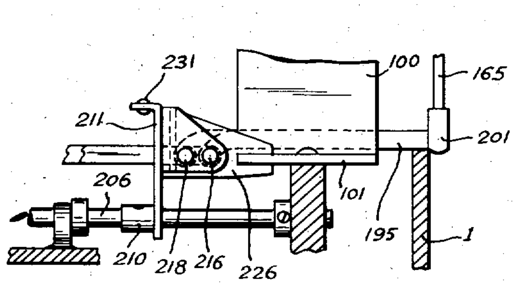
Fig. 34 is a rear elevation of the mechanism for shifting the bails by operation of the shift keys.

The vertical arm 211 has a lug 212 formed at the upper end thereof and connected to a member 230 on the bar 220 by a tension spring 231, serving to maintain continuous contact of the vertical arm 211 with the left-hand end (Fig. 34) of the bar 220. Upon oscillation of the rock shaft 206 and the vertical arm 211, longitudinal movement is imparted to the bar 220, shifting the bails 189 and 191 to the right. This movement is effected by depression of either shift key 22 and positions the bails 189 and 191 relative to the printing key levers 4 to provide the proper spacing for the symbols printed by the second shuttle 15'.

As before stated, it is necessary to provide movement of the gear 146 through the space of three zones to produce its full contribution to the feed of the message tape 98 per symbol. Hence, auxiliary means are provided to add an additional step to the two-zone movement produced by means of the bail 191. For this purpose, the rock shaft 25 has a fixed arm 232 extending downward therefrom (see Fig. 30), the lower end thereof having an opening 233 in which the hooked end 234 of the lever 235 is inserted. The lever 235 has a rod 237 connected at a point intermediate its ends and passing through a guide 240 in the frame 1. The rear end of the rod 237 has an angular plate secured thereto having a horizontal portion 241 provided with a rectangular opening 242 (see Fig. 29). A finger 244 of the cam plate 199 on the lower end of the link 166 projects through the opening 242. The cam plate 199 has a cam slot 198 formed therein with the pin 197 of arm 196 projecting therethrough. Inasmuch as the pin 197 is a fixed distance from the axis of the shaft 190, it moves only in an arc concentric therewith. However, the cam plate 199 is movable toward and away from the axis of shaft 190 as a result of reciprocation of the rod 237. Relative movement between the cam plate 199 and the pin 197 results in movement of the cam plate, thus moving the link 166 vertically or maintaining its position unchanged depending upon the position of the pin 197 in the cam slot. When the shuttle 15 is in position at the printing point, the cam plate 199 is positioned so that the pin 197 is at the midpoint of the cam slot 198. If the rod 237 and cam plate 199 are moved rearwardly, the upwardly inclined part of the cam slot causes the cam plate to move downward together with the link 166. If, however, the rod 237 is moved in the opposite direction, the horizontal part of the cam slot 198 causes the cam plate 199 to move forward horizontally over the pin 197, thereby producing no effective movement of the link 166.

Depression of the shift key 22 oscillates the shaft 25 to move the lever arm 232 rearwardly, carrying with it the lever 235 and rod 237, with the result that the finger 244 of cam plate 199 also moves rearwardly, the cam slot 198 sliding over the pin 197 and causing downward movement of the cam plate 199 and link 166. This downward movement of the link 166 acts upon the selector quadrant 162 (see Fig. 25) causing it to shift the gear 146 one step to the left, thereby bringing its first group of teeth (zone *e*) into the plane of pinion 144. Shifting of the gear 146 to bring the first group of teeth into the plane of pinion 144 always occurs upon operation of the shift key. As previously described, the link 31 is connected by a tension spring 80 to the rear portion of the upright 105. Hence, as soon as the shift key is released, the shaft 25 is returned to its original position by tension of the spring 80, acting through link 31 and arm 29, thus returning the gear 146 one step to the right, the normal position for operation of the shuttle 15.

*Hammer mechanism*

A hammer 267 (see Figs. 14 and 37) is pivoted on frame 1 for oscillation about an axis 275 in the plane of message tape 98 at the printing point 97, the striking face 268 of the hammer being in a plane radial to the hammer axis 275. Hence, the face 268 of the hammer, upon making a stroke, drives the message tape and printing ribbon against the type throughout the full vertical length of the type and lengthwise of the tape 98. The hammer 267 has a bifurcation extending forwardly of the axis 275 consisting of a downwardly extending arm 263 and a forwardly extending arm 266. The forwardly extending arm 266 is provided with a pawl 277 for engagement with a ratchet wheel 278 (see Fig. 37) to impart a step-by-step rotation thereto and actuate the ribbon feeding mechanism. This construction is similar to that described in the patent to Ralph C. Coxhead No. 2,161,856 of June 13, 1939, to which reference is made for an amplified description.

Figures 12, 13, 14:
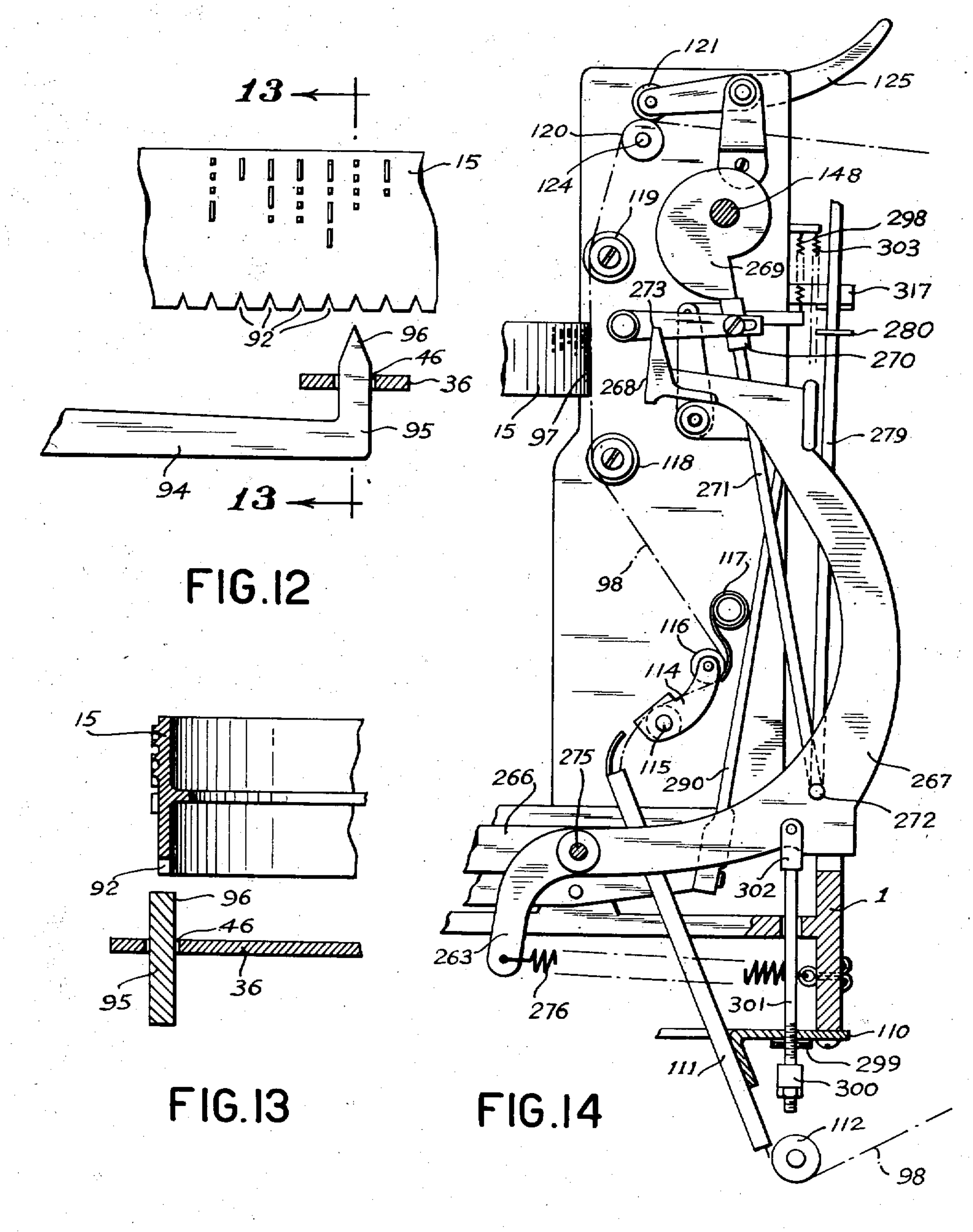
Fig. 12 is a detailed elevational view from the rear of the machine showing the shuttle and type locking device whereby the type is locked at the printing point during the printing operation.
Fig. 13 is a detailed sectional view of the type locking device on the line 13—13 of Fig. 12.
Fig. 14 is a right-side elevational view of the printing hammer operating mechanism, and the means for feeding the message tape past the printing point.

A tension spring 276 is connected at one end to the arm 263, the other end of the spring being attached to the frame 1, and the tension of the spring impelling the hammer 267 for its printing stroke. During rotation of the shaft 148, a rotary cam of spiral cross section 269 fixed thereto (see Fig. 14) depresses the head 270 of a trip rod 271 to thrust back the hammer 267 against the tension of the spring 276. Rotation of the shaft 148, always a single rotation, causes return of the cam 269, trip rod 271 and the hammer 267 to the position shown in Fig. 14, in which position the reset hammer 267 is retained by the rod 271 positioned between the cam and a pivot stud 272 on the hammer 267. The cam 269 is provided with an abrupt radial drop on its surface, which, in the position shown in Fig. 14, is closely adjacent the head 270 of the rod 271. By mechanism hereinafter described, the head 270 may be moved across the nose of the cam 269 to release the hammer 267. A link 273, pivoted to the upright 102 and connected to the rod head 270, positions the upper end of rod 271 while allowing limited movement thereof.

A clutch control rod 279, also pivoted to the hammer 267 by the stud 272, extends vertically through an aperture in a clutch trip lever 317, hereinafter described. A collar 280 on the rod 279 contacts the trip lever 317 at about the time the hammer 267 strikes the type 96 for the purpose of tripping the lever 317 against the bias of the spring 354 (see Fig. 38) in order to cause actuation of the clutch 322 after printing a symbol.

In order to lock the shuttle 15 or 15′ during the stroke of hammer 267, a link 281 is pivoted at one end 282 (see Fig. 18) to the hammer 267, and at the opposite end 283 to an arm 284. The arm 284 is fixed on a shaft 285 journaled in a bracket 289 on the upright 100, on which shaft the type lock 94 is fixed. By this linkage, the shuttle 15 or 15′ is freed from engagement of the type lock 94 while the hammer 267 is in its set position at which time the printing keys are free to position the shuttle, as well as the gears 145 and 146. Release of the hammer, after the gears and shuttle are brought to the selected position, locks the shuttle 15 or 15′ before the printing impression is made.

In order to trip the hammer 267 at the proper time, a mechanical linkage is provided. It will be noted that the end 5 of each key lever 4 extends under a universal bar 286 (see Fig. 30) which rocks the universal bar frame 287 on a pivot 288, thus lowering the opposite end 289 of the frame 287 and drawing a link 290 downward, oscillating a bell crank lever 291 to which it is connected. The bell crank lever 291 is pivotally connected at the upper end 294 to a push bar 295 having a shoulder 296 adapted to contact a pin 297 extending from the head 270 of the hammer trip rod 271. The push bar 295 is held upward against the pin 297 by a tension spring 298. A downward pull on the link 290, acting through the linkage above-described, caused by operation of a printing key, pushes the head 270 of the trip rod 271 to the rear until it clears the nose of the cam 269, permitting the trip rod 271 to move upwardly parallel to the radial portion of the cam as the hammer 267 is oscillated forward by the spring 276 for a printing stroke. A spring 303, attached to an arm of the bell crank lever 291, biases the link 290 upward, rendering the hammer trip normally in operation.

In order to cushion the stroke of the hammer 267 against the type shuttle 15 or 15′, a flat spring 299 (see Fig. 14) is secured to the bracket 110. A rod 301 having an end 302 pivotally connected to the hammer 267, passes through an aperture in the free end of the spring 299 and carries a collar 300 secured thereto below the spring 299. A stroke of the hammer 267 serves to draw the rod 301 upwardly so that the collar 300 contacts the spring 299 immediately prior to the impact of the hammer against the shuttle 15 or 15′ thus cushioning the hammer stroke and providing a rebound therefrom.

*Operation of the space bar*

Upon placing or locking of the shift key 22 in operative depressed position, an auxiliary shifting of the gear 146 is effected. In order to counteract this movement when operating the space bar so as to obtain a uniform spacing of the words regardless of position of the shift keys 22, linkage is provided. Accordingly, a space bar lever 236 (see Fig. 37) is pivoted on a member 238 secured to the frame 1. The lever 236 carries a pin 239 against which a bell crank lever 245, pivoted on the rock shaft 25, is held by the tension of a spring 246 secured between the lever 245 and the frame 1.

Depression of the space bar acts to raise the rear portion of the space bar lever 236, whereby the pin 239 oscillates the bell crank lever 245 to move the floating lever 235 toward the front of the machine, the hooked end 234 of the lever 235 remaining stationary, thereby drawing the rod 237 forward, together with the cam plate 199. This movement causes the cam plate 199 and link 166, attached thereto, to rise due to action of the pin 197 within the cam slot 198 of the plate 199, thereby shifting the gear 146 one step to the right (see Fig. 25) so that it is removed from the plane of the pinion 144. The movement of the space bar lever 236, at the same time, raises the bail 191 (see Fig. 32) which, acting through the shaft 192 and the arm 195, draws the link 165 downward to bring zone *b* of the gear 145 into action, resulting in four teeth being effective to rotate the pinion 144 and giving the allotted spacing to be effected by the space bar. When the shift key is not depressed, upon operation of the space bar, the idle horizontal portion of the cam slot 198 is drawn forward by the rod 237, thereby producing no effective movement of the link 166.

Figures 37, 38, 39:
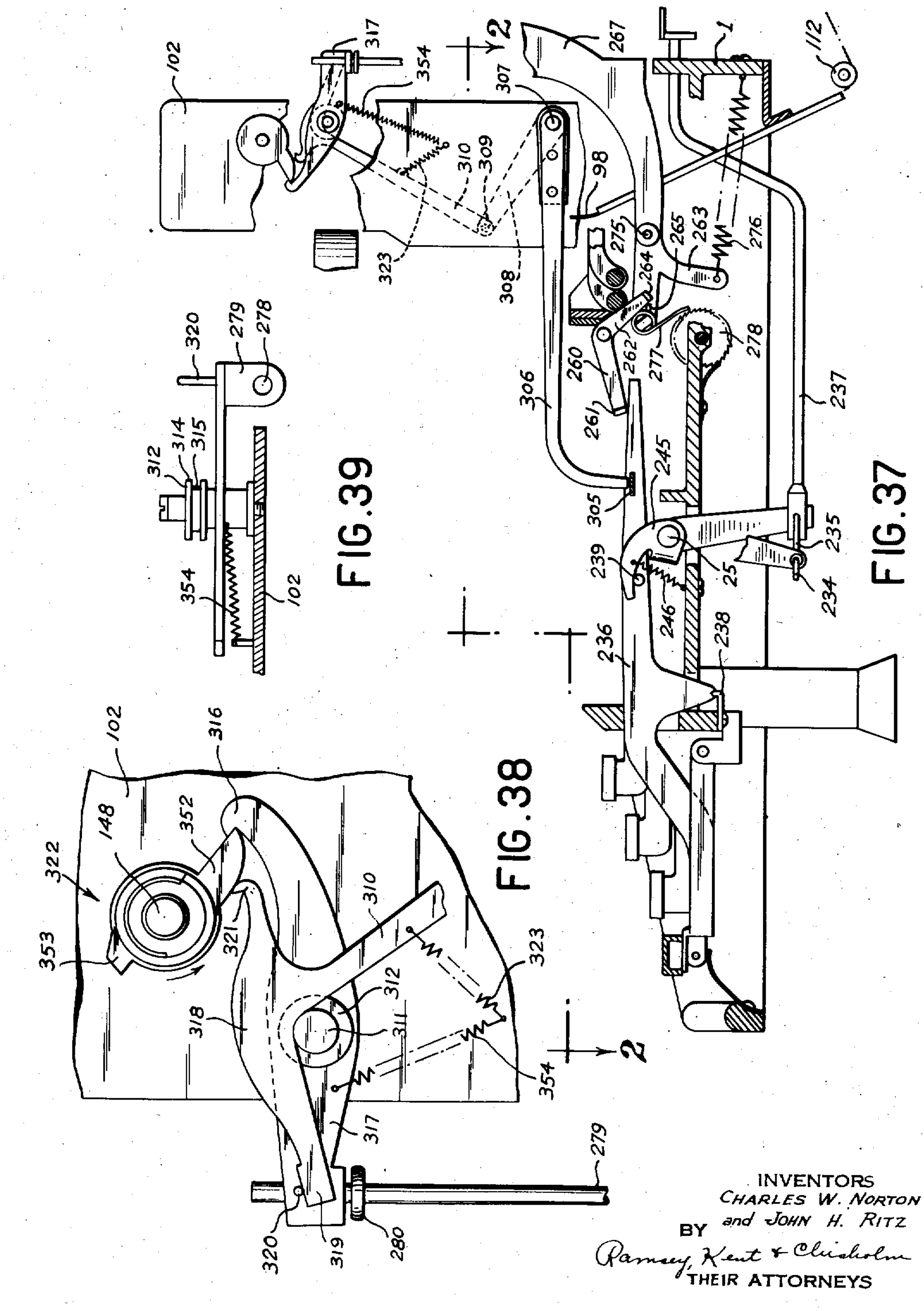
Fig. 37 is a right-side elevational view showing the mechanism by which the space bar controls rotation of the tape feeding shaft.
Fig. 38 is an enlarged left-side elevation of mechanism for controlling rotation of the type feeding shaft.
Fig. 39 is a top plan view of a portion of the mechanism shown in Fig. 38.

The setting of the gear 145 for feeding of the tape 98 by depression of the space bar is followed by actuation of the shaft 148 by engagement of the clutch 322. Accordingly, the space bar lever 236 (see Fig. 37) is provided with a projecting lug 305 coacting with a lever 306 fixed to a shaft 307 journaled in upright 102. The shaft 307 has an arm 308 fixed thereto on the opposite side of the upright 102 (shown in dotted lines in the drawing), which arm has a lifting element 310 pivoted at the end 309 thereof in order to actuate the clutch trip lever 317. Fig. 38 shows the relation of the lifting element 310 to the clutch tripping mechanism as viewed from the opposite side of the upright 102, and Fig. 39 shows a top plan view thereof. The clutch trip lever 317 is pivotally mounted on a stud shaft 311 secured in the upright 102, which shaft constitutes a bearing for a hub 312 of the trip lever. The hub 312 has an enlarged portion 314 in which a circumferential groove 315 is formed. A latching hook 316 is formed at the end of the trip lever 317 for engaging a dog 352 of the clutch 322.

The lifting element 310 has a T-headed upper end 318, one end 319 of which is positioned underneath a pin 320 projecting from the trip lever 317. The lifting element 310, including the T-headed end 318, normally rests in the groove 315 of hub 312, in which it is yieldably held by tension spring 323.

Depression of the space bar and consequent upward movement of the lifting element 310 causes the end 319 thereof to contact and lift the pin 320, thus oscillating the trip lever 317 on stud shaft 311 and lowering the hook 316, releasing the dog 352 to initiate engagement of the clutch 322. It is essential, however, that the clutch trip lever 317 promptly return to a position in which the hook 316 will again engage the dog 352 in order to release the clutch at the end of a single rotation. Accordingly, a dog 353 on shaft 148 is provided for engagement with a hook 321 formed on the opposite end of the T-headed end 318, upon rotation of the shaft 148, to withdraw the end 319 thereof from beneath the pin 320 on the trip lever 317, thus permitting the return of the trip lever to position for engagement with the dog 352. This construction assures disengagement of the clutch 322 even though the lifting element 310 remains in elevated position through failure to release the space bar quickly, and prevents more than a single rotation of the shaft 148 for each operation of the space bar.

In order to prevent the hammer 267 from operating upon depression of the space bar, the space bar lever 236 is extended rearwardly to a point underlying a universal bar 261 pivotally mounted in frame 1 (see Fig. 37) by arms 260. An arm 262, fixed to one of the arms 260, extends rearwardly and terminates in a flanged end 264, positioned so as to bring the end 264 beneath a shoulder 265 formed on the forwardly extending arm 266 of the bifurcated end of the hammer 267 upon operation of the space bar. The effective engagement of the end 264 with the shoulder 265 occurs before release of the hammer, thus restraining the hammer from movement upon operation of the space bar.

*The clutch*

A bracket 324 (see Fig. 18) is secured to the upright 105 to serve as a mounting for a driving motor 325. While this machine is being operated, the motor 325 runs continuously, being connected by a shaft and pinion (not shown) to a driven gear 326 which has the clutch 322 connected thereto, both the clutch and the gear 326 being mounted for rotation on the driving shaft 148. An end bearing 327 for the shaft 148 (see Fig. 40) may be provided on a bracket 328 secured to the upright 105. Other bearings for the shaft 148 may be provided in the uprights 100 and 102. The gear 326 is provided with a hug 329 freely rotatably on the shaft 148. The gear 326, the hub 329 and a counterbored driving sleeve or collar 330 are held in rigid assembled relation by screws 331 (only one of which is shown) passing through the gear and the flange on the hub and being secured in the driving sleeve 330. This comprises the driving portion of the clutch 322.

The driven portion of the clutch 322 comprises a sleeve or collar 332 firmly attached as by a press fit to a drum 334 fixed on the shaft 148. The drum 334 has two concentric cylindrical portions 335 and 336 of different diameters. The collar 332 is pressed on the smaller diameter portion 335 of drum 334 until a shoulder 337 thereof contacts the shoulder of drum 334 between the cylindrical portions 335 and 336. The outer diameter of the shoulder 337 on the collar 332 is greater than that of the portion 336 of the drum 334, thus providing an annular recess between the collar 332 and the drum 334. A coiled clutch spring 339 is positioned within this annular recess and is of such size as to fit tightly against the outer wall of the recess while remaining out of contact with the drum 334. The collar 332 is provided with a recess 340 at one point of juncture of the shoulder 337 with the wall of the counterbore 338 of collar 332 to receive an end 341 of the spring 339 in order to connect the end of the spring to the collar 332. The end 341 of the spring 339 may be given a conformation adapted to insure a positive connection (see Fig. 41).

The larger cylindrical bore of the collar 330 is of such internal dimension to rotate freely over the collar 332 while the smaller bore thereof normally frictionally engages the peripheral surface of the coil spring 339. By this structure, rotation of the gear 326 and the sleeve 330, which is clockwise as viewed from the right of Fig. 40, exerts a torque on the spring 339 and the sleeve 332 in a direction urging the spring into greater frictional engagement against the inner surface of the sleeve 330.

A collar 347 is provided to relieve the spring 339 from engagement with the sleeve 330, which collar is oscillatable to a limited extent on the shaft 148. The larger portion of the drum 334 has a counterbore 345 for reception of a projecting portion 346 of the collar 347. The collar 347 is also provided with a cylindrical portion 348 of the same external diameter as the portion 336 of the drum 334, being normally free from contact with the spring 339. A recess 349 provided in collar 347 adjacent the cylindrical portion 348 receives the end 342 of the spring 339, thus connecting the spring 339 with the collar 347. Inasmuch as the collar 347 is not fixed to the shaft 148 and exerts no inherent torque on the spring 339, the spring is permitted to expand normally against the inner surface of the sleeve 330, thus uniting the driving and driven portions of the clutch.

Resistance to rotation of the sleeve 347 with the spring 339 exerts a torque on the spring tending to wind it into tighter convolutions, thus contracting its outer diameter and reducing its frictional engagement with the sleeve 330. Accordingly, the collar 347 is provided with a second collar 350 positioned therearound. The second collar 350 carries the dog 352 which is engaged by the hook 316 on the clutch arm 317, as previously described, during rotation of the clutch to stop rotation of the collar 347 and cause disengagement of the clutch 322. A dog 353 positioned on the second collar 350 does not engage the hook 316, and rotates idly except when the lifting element 310 has been raised by depression of the space bar, at which time it contacts the hook 321 on the T-headed end 318 of the element 310, drawing the end 319 thereof from beneath the pin 320 of the clutch lever 317, thus permitting the clutch lever to return to position for engaging the dog 352 and disengaging the clutch 322 after a single rotation thereof. The second collar 350 is provided with a set screw 351 so that it may be adjusted to any desired angular position on the collar 347.

Figures 40, 41, 42, 43, 44:
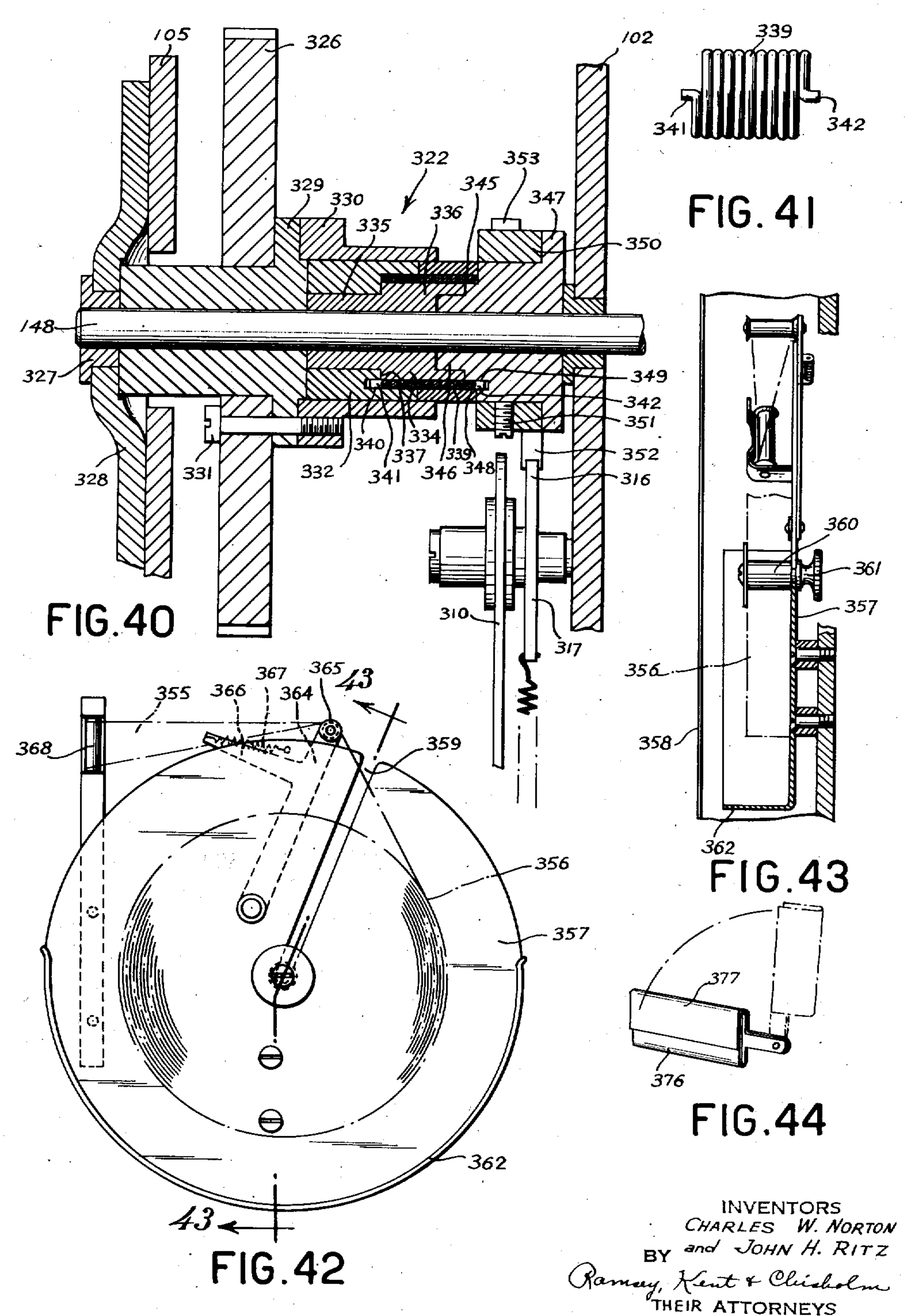
Fig. 40 is an enlarged sectional view of the single rotation clutch.
Fig. 41 is an elevation of the coil spring clutch-engaging element.
Fig. 42 is a side elevation of the carbon ribbon supply roll holder.
Fig. 43 is a sectional view of the supply roll holder taken in general on the line 43—43 of Fig. 42.
Fig. 44 is a perspective view of a carbon ribbon shield.

In operation, the gear 326 and the sleeve 330 rotate clockwise continuously, as viewed from the right of Fig. 40. Frictional engagement of the sleeve 330 with the coil spring 339 tends to rotate the spring together with the sleeve 330, rotating the sleeve 347 in the same direction. The spring 339, which is fixed to the collar 332, transmits torque thereto tending to expand the spring against the sleeve 330, thereby increasing the frictional engagement with that sleeve. However, engagement of the hook 316 with the dog 352, as above described, stops rotation of the sleeve 337, thus disengaging the spring 339 from the sleeve 330, the angular position of the second collar 350 carrying the dogs 352 and 353 determining the degree of rotation to be imparted to the shaft 148 before the clutch 332 is disengaged. After rotation of the shaft 148 has been stopped, the clutch remains disconnected until actuation of the clutch trip arm 317 by operation of a printing key or the space bar.

*Ribbon feed*

As already described, the cyclic operation acts through the resetting of the hammer 267 to feed the pigment ribbon 355 between the shuttle 15 or 15′ and the message tape 98. The ribbon 355 (see Fig. 42) is drawn from a supply roll 356 supported by a roll holder 357. The roll holder 357 may be secured in a vertical position on the frame 1 within a casing 358. A radial slot 359 is provided in the vertical wall of the roll holder 357 to permit insertion of a spindle 360 upon which the roll 356 is mounted. The spindle 360 may be clamped in position in the holder by a thumb nut 361. The roll holder 357 has a semicircular flange 362 about the lower portion thereof to serve as a shield for the roll 356. An arm 364, pivoted to the roll holder 357, carries a horizontal roller 365 over which the ribbon 355 is drawn as it is withdrawn from the roller 356. The pivoted arm 364 has a projection 366 to the end of which a tension spring 367 is secured, whereby the roller 365 takes up the slack in the ribbon 355. The path of the ribbon 355 is changed from horizontal to vertical by a vertically positioned roller 368 from which the ribbon passes through a guide 369 (see Fig. 18) leading to the printing point. Deflection of the ribbon 355 from the plane of the message tape is prevented by a vertical post 370 mounted on the spacing rod 108 and over which it is passed, after which the ribbon is passed through the shield 371, between feed rolls 372 and 373 (see Fig. 1) and through the shield 374, after which the used ribbon is fed from the machine and discarded. The feed roll 372 is driven from the ratchet 278 by means of shafts 379 and 380 (see Fig. 35) carrying meshing bevel gears 381 and 382, respectively, so that movement of the hammer 267 rotates the feed roll. The second feed roll 373 is rotatably mounted on an arm 378 pivoted on a ribbon cup 375 mounted on an upright, not shown, secured to the frame 1. The arm 378 is urged forwardly to maintain the feed rolls 372 and 373 in contact by means of a spring, not shown. The construction of the ribbon cup and feed roll mechanism is similar to that shown in the patent to Ralph C. Coxhead, No. 2,161,856, issued June 13, 1939, to which reference is made for a more complete description of these parts.

The shields 371 and 374 are substantially identical in construction and consist of a U-shaped sheet metal channel 376 (see Fig. 44) through which the ribbon 355 passes and to which a second sheet metal channel 377 may be pivoted, the second channel having its legs sufficiently spaced to permit it to fold down over the channel 376 to form a guide for the ribbon. The shields 371 and 374 are attached to the ribbon cup 375 (see Fig. 1).

It is to be understood that while the invention is described herein as applicable to a typewriting machine of a kind known as "Varityper," it is capable in its broader aspects of use with other kinds of typewriting machines and is to be understood as limited in its scope only as indicated in the appended claims. Further, while in the description reference has been made to use of this machine for typing of dot-and-dash symbols of the telegraphic code, it is equally applicable for the typing of any symbols of varying lengths, and certain features of the invention are equally applicable to typewriters generally.

We claim:

1. A typewriter comprising: means for presenting dot-and-dash code type symbols at a printing point, including printing keys for selecting type symbols, means, including a variable ratio gearing drive, for feeding a message tape past the printing point in a direction corresponding to the longer dimension of the type symbols, means for producing a printed impression of the selected symbol on the tape and mechanism actuated by the printing keys for varying the ratio of the gearing of the message tape feeding means in accordance with the length of the individual printed symbol.

2. A typewriter comprising: means for presenting dot-and-dash code type symbols in a single line at a common printing point, including printing keys for selecting type symbols, means for feeding paper past the printing point in a direction corresponding to the longer dimension of the type symbols, means for producing a printed impression of the selected symbol on the paper, means, including a shaft adapted for intermittent single rotational movement, for advancing the paper after the printing of each symbol, and mechanism actuated by the printing keys for varying the action of the paper advancing means in accordance with the length of the individual printed symbol.

3. A typewriter comprising: means for presenting type symbols of varying lengths at a printing point, including printing keys for selecting type symbols, means for feeding paper past the printing point in a direction corresponding to the longer dimension of the type symbols, means for producing a printed impression of the selected symbol on the paper, means, including a driving shaft, a driven shaft, variable ratio drive means connecting said shafts and means for intermittently rotating said driving shaft a uniform amount, for advancing the paper after the printing of each symbol, and means controlled by the printing keys for varying the ratio of said drive means and rotating said driving shaft, whereby said paper is advanced in accordance with the length of the individual printed symbol.

4. A typewriter comprising: means for presenting type symbols of varying lengths at a printing point, including printing keys for selecting type symbols, means for feeding paper past the printing point in a direction corresponding to the longer dimension of the type symbols, means for producing a printed impression of the selected symbol on the paper, means, including a driving shaft, a driven shaft, variable ratio drive means connecting said shafts and means for intermittently rotating said driving shaft a uniform amount, for advancing the paper after the printing of each symbol, and means controlled by the printing keys for varying the ratio of said drive means, whereby action of the paper advancing means is altered in accordance with the length of the individual printed symbol.

5. In a typewriting machine, a type carrier having an arcuate surface and adapted to be oscillated about the axis of said surface, and individually-aligned dot-and-dash code type symbols of varying lengths embossed on said surface with the longer dimension parallel to said axis.

6. In a typewriting machine, a type carrier having an arcuate surface and adapted to be oscillated about the axis of said surface, and individually-alined dot-and-dash code type symbols of varying lengths embossed on said surface with the longer dimension parallel to said axis, said type being uniformly spaced from one edge of said surface.

7. In a typewriting machine, a type carrier having an arcuate surface and adapted to be oscillated about the axis of said surface, type symbols of varying lengths formed on said surface with their longer dimension parallel to said axis, means for selectively presenting individual symbols at a printing point, means for feeding paper past said printing point in the direction of the longer dimension of said symbols, means for forming a printed impression on said paper, and means for controlling said paper-feeding means in accordance with the length of the individual printed symbol, the leading ends of said symbols lying in a common plane perpendicular to said axis.

8. In a typewriting machine having printing keys, shift keys and a space bar, a paper feed mechanism, a variable ratio gearing for operating said feed mechanism, and means operatively connected with said printing keys for varying the ratio of the gearing, said shift key being operatively connected to said gearing for varying the ratio thereof upon actuation of the shift key, and said space bar being operatively connected to said gearing and adapted, upon operation, to neutralize the action of said shift key on said gearing.

9. A typewriter comprising: means for presenting type symbols of varying lengths at a printing point, including printing keys for selecting type symbols, means, including two coacting stepped mutilated driving gears adapted to present a variable number of operative teeth and a coacting driven gear, for feeding paper past the printing point, means for producing a printed impression of the selected symbol on the paper, and mechanism actuated by the printing keys to shift the mutilated gears relative to the coacting driven gear for varying the action of the paper feeding means in accordance with the length of the individual printed symbol.

10. A typewriter comprising: means for presenting type symbols of varying lengths at a printing point, including printing keys for selecting type symbols, means for feeding paper past the printing point in a direction corresponding to the longer dimension of the type symbols, means for producing a printed impression of the selected symbol on the paper, means including a driven shaft having a pinion thereon and a driving shaft having two mutilated gears slidably mounted thereon, for advancing the paper after the printing of each symbol, and means controlled by the printing keys for sliding said mutilated gears relative to said pinion to vary the gear ratio between said driving and said driven shaft whereby action of the paper advancing means is altered in accordance with the length of the individual printed symbol.

11. A typewriter comprising: means for presenting type symbols of varying lengths at a printing point, including printing keys for selecting type symbols, means for feeding paper past the printing point in a direction corresponding to the longer dimension of the type symbols, means for producing a printed impression of the selected symbol on the paper, means, including a driven shaft having a pinion thereon, a driving shaft having two mutilated gears slidably mounted thereon, and means intermittently rotating said driving shaft a uniform amount, for advancing the paper after the printing of each symbol, and means controlled by the printing keys for sliding said mutilated gears relative to said pinion to vary the gear ratio between said driving and said driven shafts, whereby action of the paper advancing means is altered in accordance with the length of the individual printed symbol.

12. A typewriter having a circular anvil, a type shuttle having vertically arranged type for printing dot-and-dash code symbols and movable about the circumference of said anvil to bring selected type to a printing point, means for feeding a message tape vertically past the printing point while maintaining one edge thereof in exact relation thereto, a printing hammer for striking the message tape against the type, and a type lock operatively connected to the printing hammer for engaging the type shuttle at the instant of printing contact of the tape with the selected type, whereby the type is accurately positioned relative to the edge of the message tape.

13. A typewriter having a circular anvil, a type shuttle having vertically arranged type for printing dot-and-dash code symbols, means for moving the shuttle about the anvil to bring selected type to the printing point, a message tape holder, and a pair of guide rollers mounted on parallel horizontal spindles on opposite sides of the printing point, each roller comprising two axially separate parts having flanges engaging the edges of the tape, one of said parts rotating with its flange in a fixed vertical plane and the other yieldably held with its flange against the edge of the tape, whereby the type is maintained with one edge thereof a uniform distance from the printing point.

14. In a typewriting machine, embossed type, printing keys for presenting selected type at a printing point, means for feeding paper past the printing point, a printing hammer, an element holding the printing hammer normally inoperative, a spring for urging the hammer towards the type for forming a type impression on the paper, a release for the hammer-holding element, means connecting each printing key with said release for releasing the hammer after presentation of a selected type at the printing point, a driving shaft for actuating the paper-feeding means, means for imparting a single rotation to the driving shaft for each operation of a printing key, and a cam actuated by the driving shaft and operative through said element for restoring and maintaining the printing hammer in inoperative position after forming the type impression.

15. In a typewriting machine, embossed type, printing keys for presenting selected type at a printing point, means for feeding paper past the printing point, a printing hammer, an element holding the printing hammer normally inoperative, a spring for urging the hammer towards the type for forming a type impression on the paper, a release for the hammer-holding element, means connecting each printing key with said release for releasing the hammer after presentation of a selected type at the printing point, a driving shaft for actuating the paper-feeding means, means for imparting a single rotation to the driving shaft for each operation of a printing key, and a radially-stepped cam actuated by the driving shaft and operative through said element for restoring and maintaining the printing hammer in inoperative position after forming the type impression.

16. In a typewriting machine, embossed type, printing keys for presenting selected type at a printing point, means for feeding paper past the printing point, a printing hammer normally held inoperative, a spring for urging the hammer towards the printing point to form a type impression on the paper, a release for the hammer, means connecting each printing key with said release for releasing the hammer after presentation of a selected type at the printing point, a driving shaft for actuating the paper-feeding means, a continuously rotating motor and clutch for rotating the driving shaft, means actuated by the hammer upon completion of the printing stroke for engaging the clutch to rotate the driving shaft, means actuated by the driving shaft for restoring the hammer to inoperative position, and means for disengaging the clutch after a predetermined rotation of the driving shaft.

CHARLES W. NORTON.
JOHN H. RITZ.

REFERENCES CITED

The following references are of record in the file of this patent:

UNITED STATES PATENTS

| Number | Name | Date |
|---|---|---|
| 344,351 | Crandall | June 29, 1886 |
| 682,759 | Sears | Sept. 17, 1901 |
| 860,876 | Lord | July 23, 1907 |
| 915,890 | Ruffin | Mar. 23, 1909 |
| 1,359,465 | Piersen | Nov. 16, 1920 |
| 1,496,146 | Carroll | June 3, 1924 |
| 1,867,155 | Huston et al. | July 12, 1932 |
| 2,079,337 | Roe et al. | May 4, 1937 |
| 2,165,223 | Chisholm | July 11, 1939 |
| 2,283,221 | Michaels | May 19, 1942 |
| 2,299,107 | Potts | Oct. 20, 1942 |
| 2,323,388 | Fitch et al. | July 6, 1943 |

FOREIGN PATENTS

| Number | Country | Date |
|---|---|---|
| 129,801 | Australia | of 1932 |

Certificate of Correction

Patent No. 2,565,985 August 28, 1951

CHARLES W. NORTON ET AL.

It is hereby certified that error appears in the printed specification of the above numbered patent requiring correction as follows:

Column 5, line 63, for "ocnnected" read *connected*; column 9, line 57, for "96" read *97*; column 14, line 31, for "speed" read *feed*; column 15, line 10, for "shafts" read *shifts*; column 19, line 71, for "hug" read *hub*; column 26, line 34, list of references cited, under the heading "FOREIGN PATENTS", for "Australia" read *Austria*;

and that the said Letters Patent should be read as corrected above, so that the same may conform to the record of the case in the Patent Office.

Signed and sealed this 25th day of December, A. D. 1951.

[SEAL]

THOMAS F. MURPHY,
*Assistant Commissioner of Patents.*